US011991384B2

(12) United States Patent
He et al.

(10) Patent No.: US 11,991,384 B2
(45) Date of Patent: May 21, 2024

(54) ADAPTIVE CONTROL POINT SELECTION FOR AFFINE MOTION MODEL BASED VIDEO CODING

(71) Applicant: Vid Scale, Inc., Wilmington, DE (US)

(72) Inventors: Yuwen He, San Diego, CA (US); Xiaoyu Xiu, San Diego, CA (US); Yan Ye, San Diego, CA (US); Philippe Hanhart, La Conversion (CH)

(73) Assignee: VID SCALE, INC., Wilmington, DE (US)

( * ) Notice: Subject to any disclaimer, the term of this patent is extended or adjusted under 35 U.S.C. 154(b) by 0 days.

(21) Appl. No.: 17/985,652

(22) Filed: Nov. 11, 2022

(65) Prior Publication Data

US 2023/0073342 A1 Mar. 9, 2023

Related U.S. Application Data

(63) Continuation of application No. 17/256,769, filed as application No. PCT/US2019/039611 on Jun. 27, 2019, now Pat. No. 11,503,328.

(Continued)

(51) Int. Cl.
*H04N 19/00* (2014.01)
*H04N 19/52* (2014.01)
*H04N 19/54* (2014.01)

(52) U.S. Cl.
CPC ............ *H04N 19/52* (2014.11); *H04N 19/54* (2014.11)

(58) Field of Classification Search
CPC ...... H04N 19/52; H04N 19/54; H04N 19/527; H04N 19/176
See application file for complete search history.

(56) References Cited

U.S. PATENT DOCUMENTS 10,462,488 B1 * 10/2019 Li ........................ H04N 19/52
10,681,379 B2 6/2020 Zhao et al.
(Continued)

FOREIGN PATENT DOCUMENTS

JP 2014-509479 A 4/2014
WO 2018/061563 A1 4/2018

OTHER PUBLICATIONS

Alshina et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.

(Continued)

*Primary Examiner* — Frank F Huang
(74) *Attorney, Agent, or Firm* — Condo Roccia Koptiw LLP

(57) ABSTRACT

Systems, methods, and instrumentalities are disclosed for motion vector clipping when affine motion mode is enabled for a video block. A video coding device may determine that an affine mode for a video block is enabled. The video coding device may determine a plurality of control point affine motion vectors associated with the video block. The video coding device may store the plurality of clipped control point affine motion vectors for motion vector prediction of a neighboring control point affine motion vector. The video coding device may derive a sub-block motion vector associated with a sub-block of the video block, clip the derived sub-block motion vector, and store it for spatial motion vector prediction or temporal motion vector prediction. For example, the video coding device may clip the derived sub-block motion vector based on a motion field range that may be based on a bit depth value.

20 Claims, 19 Drawing Sheets

Related U.S. Application Data

(60) Provisional application No. 62/778,055, filed on Dec. 11, 2018, provisional application No. 62/734,728, filed on Sep. 21, 2018, provisional application No. 62/691,770, filed on Jun. 29, 2018.

(56) References Cited

U.S. PATENT DOCUMENTS

| | | | |
|---|---|---|---|
| 11,082,692 | B2 | 8/2021 | Hollmann et al. |
| 2003/0174776 | A1 | 9/2003 | Shimizu et al. |
| 2013/0083853 | A1 | 4/2013 | Coban et al. |
| 2013/0294522 | A1 | 11/2013 | Lim et al. |
| 2017/0214932 | A1 | 7/2017 | Huang |
| 2018/0192069 | A1* | 7/2018 | Chen .................. H04N 19/176 |
| 2018/0295381 | A1 | 10/2018 | Chen et al. |
| 2019/0028731 | A1* | 1/2019 | Chuang ............... H04N 19/159 |
| 2019/0058896 | A1* | 2/2019 | Huang ................ H04N 19/159 |
| 2019/0082191 | A1 | 3/2019 | Chuang et al. |
| 2019/0110064 | A1* | 4/2019 | Zhang .................. H04N 19/54 |
| 2019/0116376 | A1 | 4/2019 | Chen et al. |
| 2019/0273943 | A1 | 9/2019 | Zhao et al. |
| 2019/0387241 | A1 | 12/2019 | Kim et al. |
| 2020/0007877 | A1 | 1/2020 | Zhou |
| 2020/0007889 | A1 | 1/2020 | Chao et al. |
| 2020/0077111 | A1 | 3/2020 | Chuang et al. |
| 2020/0186793 | A1 | 6/2020 | Racape et al. |
| 2020/0213608 | A1 | 7/2020 | Chen et al. |
| 2020/0260106 | A1 | 8/2020 | Huang et al. |
| 2020/0288121 | A1 | 9/2020 | Zhao et al. |
| 2020/0366937 | A1 | 11/2020 | Egilmez et al. |
| 2020/0404276 | A1 | 12/2020 | Nalci et al. |
| 2021/0058642 | A1 | 2/2021 | Egilmez et al. |
| 2021/0092381 | A1 | 3/2021 | Egilmez et al. |
| 2021/0092408 | A1 | 3/2021 | Ramasubramonian et al. |
| 2021/0099702 | A1 | 4/2021 | Egilmez et al. |
| 2021/0160527 | A1* | 5/2021 | Chuang ............... H04N 19/119 |
| 2021/0160541 | A1 | 5/2021 | Chiang et al. |
| 2021/0203947 | A1 | 7/2021 | He et al. |
| 2021/0211715 | A1 | 7/2021 | Chen et al. |
| 2021/0211729 | A1 | 7/2021 | Koo et al. |
| 2021/0235119 | A1 | 7/2021 | Kim et al. |
| 2022/0053206 | A1 | 2/2022 | Ko et al. |

OTHER PUBLICATIONS

Bross et al., "High Efficiency Video Coding (HEVC) Text Specification Draft 10 (For FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Bross, Benjamin, "Versatile Video Coding (Draft 1)", JVET-J1001-V2, Editor, Joint Video Experts Team (JVET) of ITU-T SG 16 WP 3 and ISO/IEC JTC 1/SC 29/WG 11, 10th Meeting: San Diego, USA, Apr. 10-20, 2018, 40 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Chen et al., "Coding Tools Investigation for Next Generation Video Coding", Qualcomm Incorporated, COM 16—C 806—E, International Telecommunication Union, Telecommunication Standardization Sector, Jan. 2015, pp. 1-7.

Ghaznavi-Youvalari et al., "CE4-Related: Merge Mode with Regression Based Motion Vector Field (RMVF)", JVET-L0171, Nokia, Joint Video Experts Team (JVET) of ITU-T SG16 WP 3 and ISO/IEC JTC 1/SC 29/WG11, 12th Meeting: Macao, CN, Oct. 3-12, 2018, pp. 1-4.

Hanhart et al., "Non-CE2: Motion Vector Clipping in Affine Sub-Block Motion Vector Derivation", JVET-M0145-V1, InterDigital Communications, Inc., Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-3.

He et al., "CE4-Related: Shape Dependent Control Point Selection for Affine Mode", JVET-K0335, InterDigital Communications Inc., Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-6.

ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.

Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.

Lin et al., "Affine Transform Prediction for Next Generation Video Coding", Huawei Technologies, ISO/IEC JTC1/SC29/WG11 MPEG2015/m37525, Geneva, Switzerland, Oct. 2015, 10 pages.

Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.

Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE, "VC-1 Compressed Video Bitstream Format and Decoding Process", SMPTE 421M, Feb. 24, 2006, 493 pages.

Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Zhang et al., "CE4.3.1: Planar Motion Vector Prediction", JVET-L0070, HiSilicon Technologies Co., Ltd., Joint Video Experts Team (JVET) of ITU- T SG16 WP 3 and ISO/IEC JTC 1/SC 29/WG11, 12th Meeting: Macao, CN, Oct. 3-12, 2018, pp. 1-4.

Akula et al., "Description of SDR, HDR and 360° Video Coding Technology Proposal Considering Mobile Application Scenario by Samsung, Huawei, GoPro, and HiSilicon", JVET-J0024_V2, Joint Video Exploration Team (JVET) of ITU-T SG 16 WP 3 and ISO/IEC JTC 1/SC 29/WG 11, 10th Meeting: San Diego, USA, Apr. 10-20, 2018, 15 pages.

Atsumichi et al., "High Efficiency Video Coding Technology HEVC/H.265 and Applications Thereof", Feb. 25, 2013, 18 pages.

Chen et al., "Algorithm Description of Joint Exploration Test Model 3", JVET-C1001_v3, Editors, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pages.

Gao et al., "CE4-Related: Sub-Block MV Clipping in Affine Prediction", JVET-L0317-r1, Tencent, Joint Video Experts Team (JVET) of ITU-T SG 16 WP 3 and ISO/IEC JTC 1/SC 29/WG 11, 12th Meeting: Macao, CN, Oct. 3-12, 2018, 9 pages.

Huang et al., "CE4-Related: Affine Clean-Up and Constrained Affine Inheritance for Local and Line Buffer Reduction", JVET-L0690, Qualcomm, Joint Video Experts Team (JVET) of ITU-T SG 16 WP 3 and ISO/IEC JTC 1/SC 29/WG 11, 12th Meeting: Macao, CN, Oct. 3-12, 2018, 10 pages.

Li et al., "AHG5: Reduction of Worst Case Memory Bandwidth", JVET-L0122-v2, Panasonic, Joint Video Exploration Team (JVET) of ITU-T SG 16 WP 3 and ISO/IEC JTC 1/SC 29/WG 11, 12th Meeting: Macao, CN, Oct. 3-12, 2018, 14 pages.

* cited by examiner

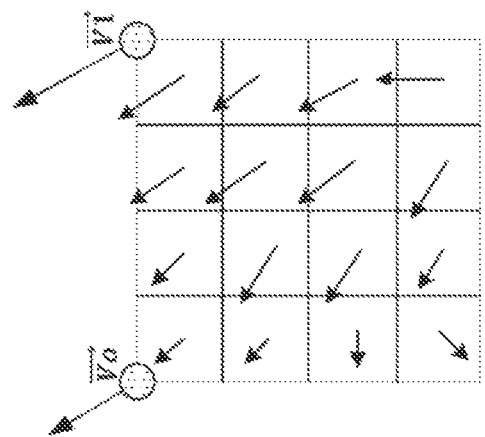
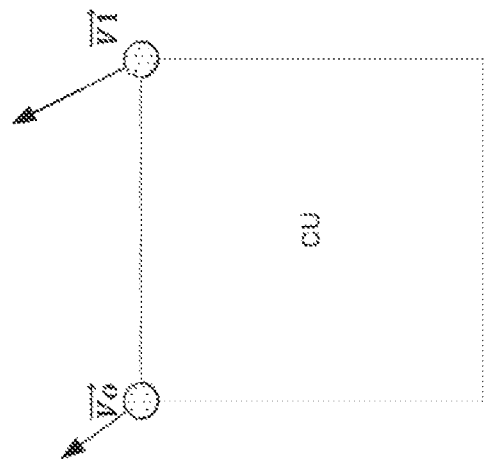
FIG. 5

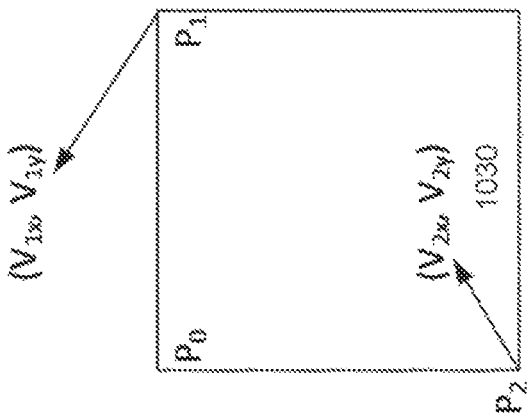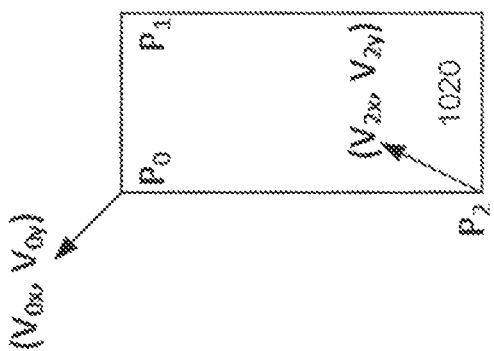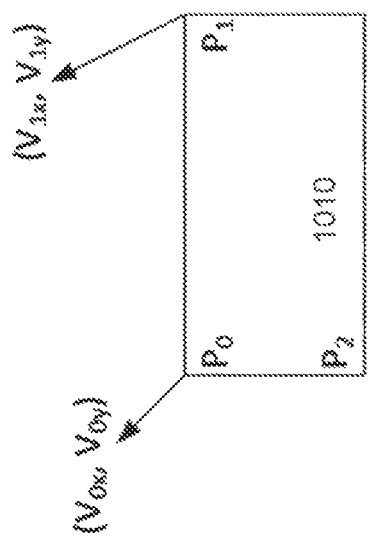
FIG. 10

ADAPTIVE CONTROL POINT SELECTION FOR AFFINE MOTION MODEL BASED VIDEO CODING

CROSS-REFERENCES TO RELATED APPLICATIONS

This application is a continuation application of U.S. Non-Provisional application Ser. No. 17/256,769, filed Dec. 29, 2020, which is the National Stage Entry under 35 U.S.C. § 371 of Patent Cooperation Treaty Application No. PCT/US2019/039611, filed Jun. 27, 2019, which claims the benefit of U.S. Provisional Patent Application Nos. 62/691,770 filed on Jun. 29, 2018, 62/734,728 filed on Sep. 21, 2018, and 62/778,055 filed on Dec. 11, 2018, the contents of which are hereby incorporated by reference herein.

BACKGROUND

Video coding systems may be used to compress digital video signals, e.g., to reduce the storage and/or transmission bandwidth needed for such signals. Video coding systems may include block-based, wavelet-based, and/or object-based systems. A block-based hybrid video coding system may be deployed. In a block-based video coding system, motion vectors associated with a sub-block of a video block may have values that may be out of a certain range. Using such values may result in unintended consequences.

SUMMARY

Systems, methods, and instrumentalities are disclosed for motion vector clipping when affine motion mode is enabled for a video block (e.g., a coding unit (CU)). A video coding device may determine that an affine mode for a video block (e.g., a current video block) is enabled. The video block may include a plurality of sub-blocks. The video coding device may determine a plurality of control point affine motion vectors associated with the video block. At least one of the control point affine motion vectors associated with the current video block may be determined using one or more control point affine motion vectors associated with one or more neighboring video blocks. The video coding device may clip the control point affine motion vectors associated with the current video block. For example, the control point affine motion vectors may be clipped based on a bit depth used for motion field storage. The video coding device may store the clipped control point affine motion vectors for motion vector prediction of a neighboring control point affine motion vector.

The video coding device may derive a sub-block motion vector associated with a sub-block. The video coding device may derive the sub-block motion vector based on one or more control point affine motion vectors. The video coding device may clip the derived sub-block motion vector. For example, the video coding device may clip the derived sub-block motion vector based on a motion field range. The motion field range may be used for motion field storage. The motion field range may be based on a bit depth value. The video coding device may store the clipped sub-block motion vector for spatial motion vector prediction or temporal motion vector prediction. The video coding device may predict the sub-block using the clipped sub-block motion vector.

The video coding device may determine the control point positions associated with the control point affine motion vectors of a video block based on the shape of the video block. For example, the control point positions may be determined based on the length and/or the width of the video block.

For example, the control point positions may include a top-left control point and a top-right control point, for example, if the width of the current video block is greater than the length of the current video block. The video coding device may classify such a video block as a horizontal rectangular video block. For example, the control point positions may include a top-left control point and a bottom-left control point, for example, if the width of the current video block is less than the length of the current video block. The video coding device may classify the current video block as a vertical rectangular video block. The control point positions may include a bottom-left control point and a top-right control point, for example, if the width of the current video block is equal to the length of the current video block. The video coding device may classify the current video block as a square video block.

BRIEF DESCRIPTION OF THE DRAWINGS

FIG. 5 shows an example of a four-parameter affine mode.

FIG. 10 shows an example of adaptive control point selection based on a block shape.

DETAILED DESCRIPTION

Figure 1A:
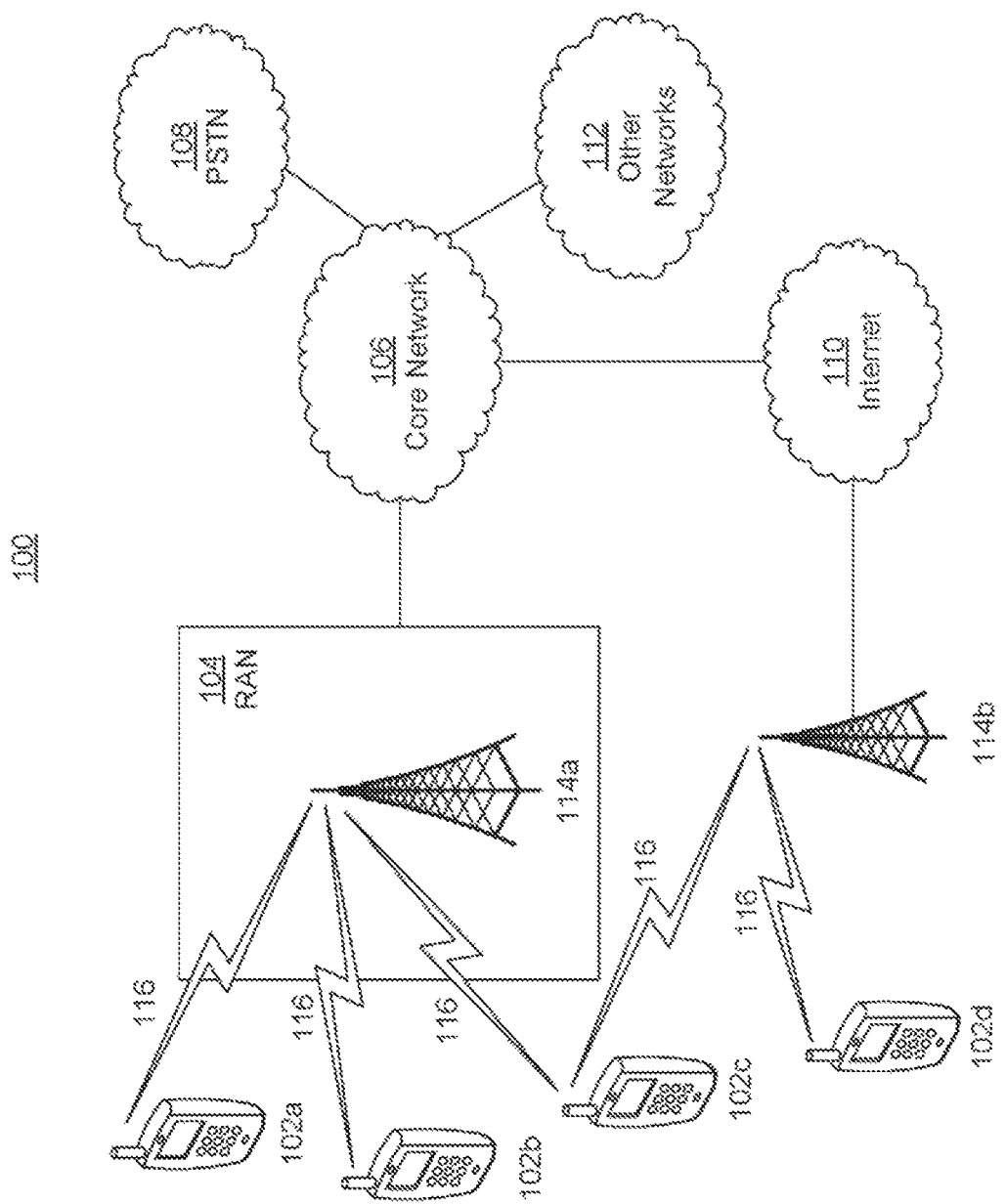
FIG. 1A is a system diagram illustrating an example communications system.

A more detailed understanding may be had from the following description, given by way of example in conjunction with the accompanying drawings wherein:

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the internet 110, and/or the other networks 112. By way of example, the base stations 114a, 114b may be a base transceiver station (BTS), a Node-B, an eNode B, a Home Node B, a Home eNode B, a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband COMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a. 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x. CDMA2000 EV-DO. Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WIMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP Internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
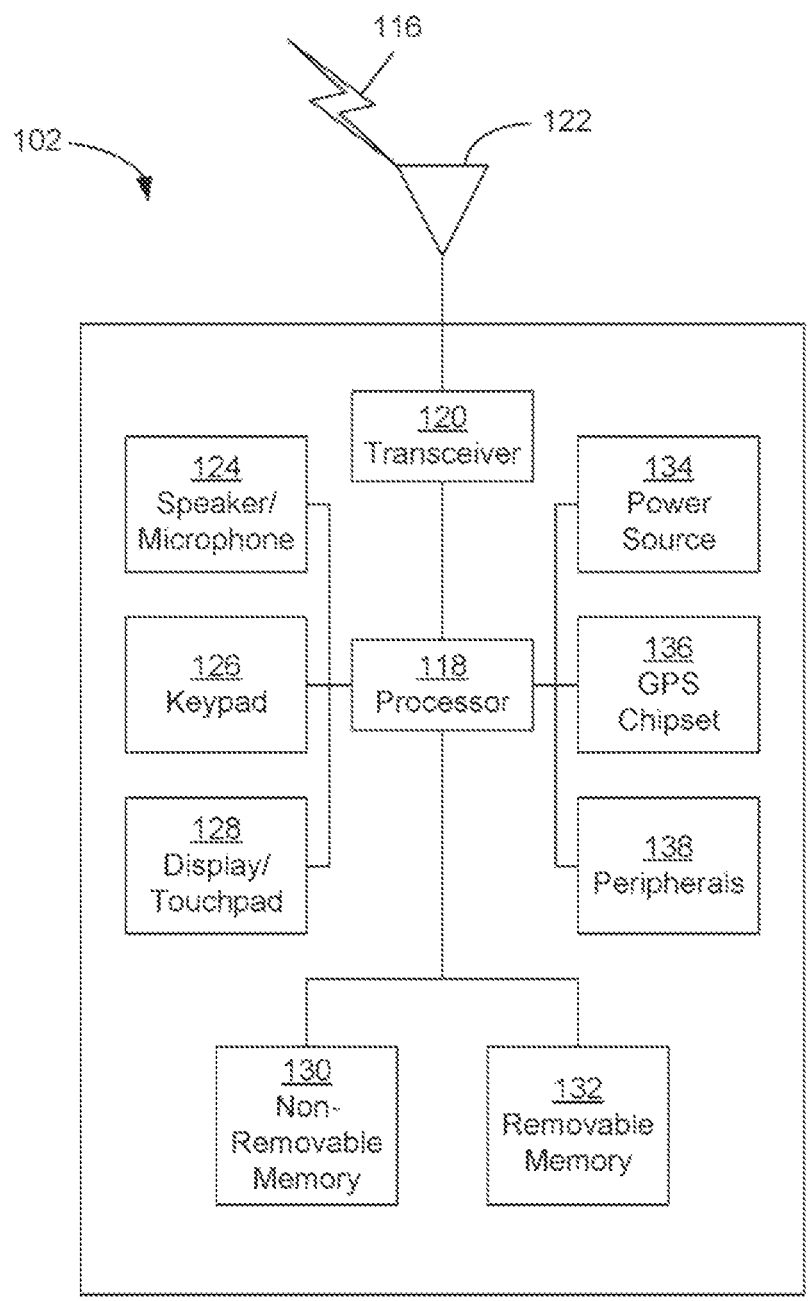
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In examples, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WIRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
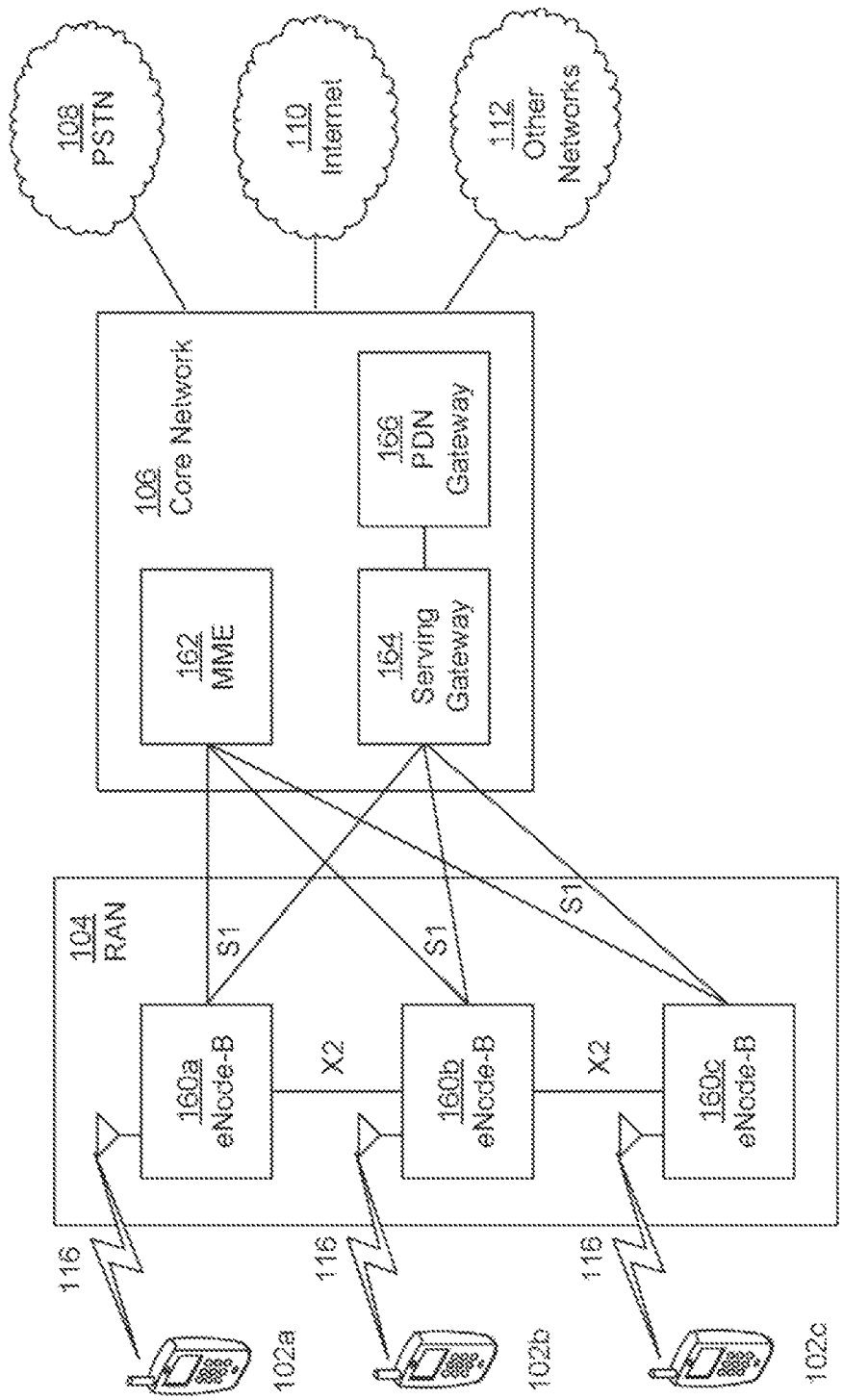
FIG. 1C is a system diagram illustrating an example radio access network (RAN) and an example core network (CN) that may be used within the communications system illustrated in FIG. 1A.

FIG. 1C is a system diagram illustrating an example RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a. 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanency) wired communication interfaces with the communication network.

In examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz. 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
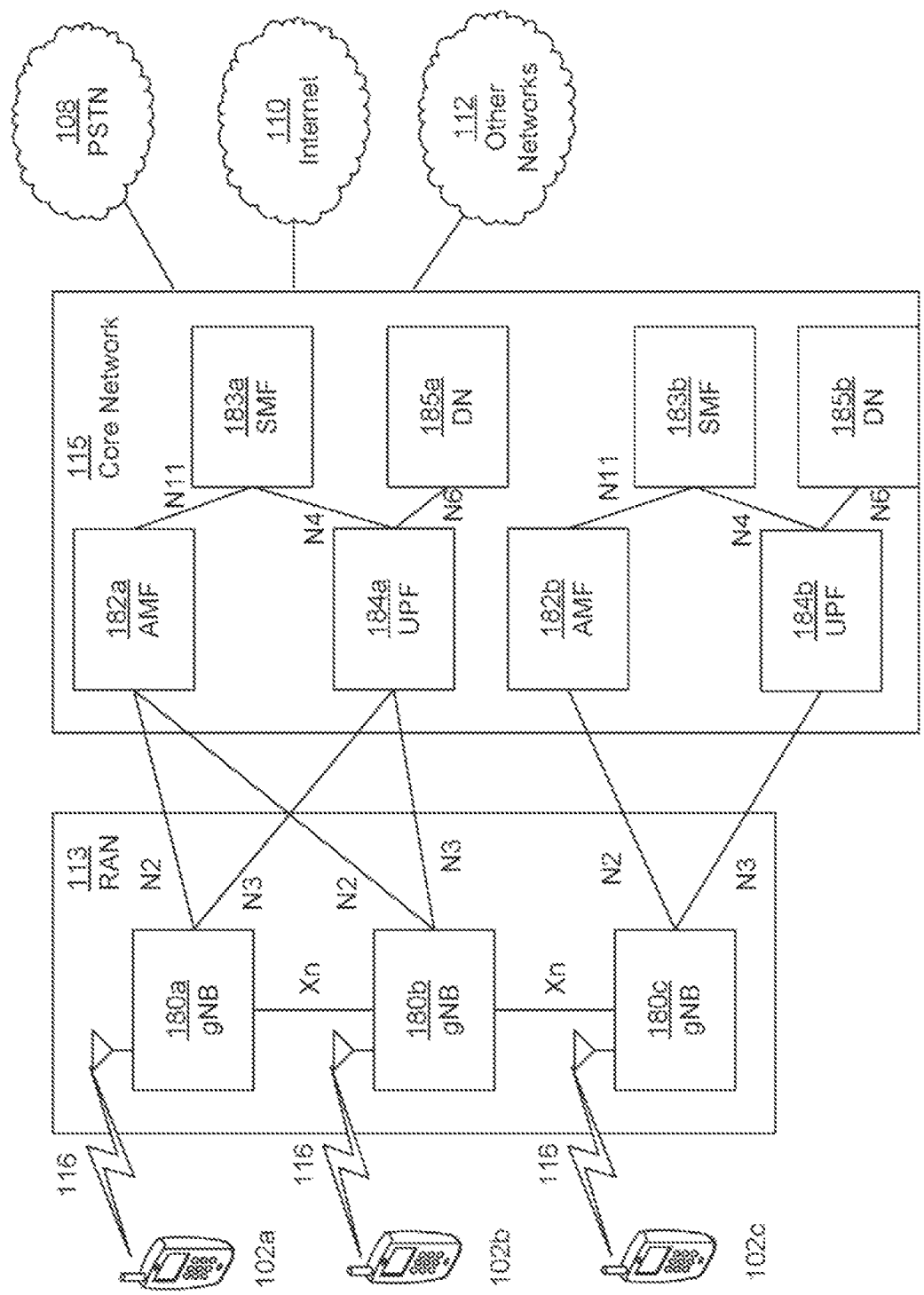
FIG. 1D is a system diagram illustrating a further example RAN and a further example CN that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a. 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a. 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be, used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Video coding systems may compress digital video signals, for example, to reduce the storage space and/or transmission bandwidth associated with the storage and/or delivery of such signals. Video coding systems may include a block-based system, a wavelet-based system, an object-based system, and/or the like.

A video coding device may be based on a block-based hybrid video coding framework. A multi-type tree based block partitioning structure may be employed. One or more of coding modules, for example, an intra prediction module, an inter prediction module, a transform/inverse transform module and a quantization/de-quantization module may be included. The video coding device may also include in-loop filters.

The video coding device may include one or more coding tools such as a 65 angular intra prediction directions, a modified coefficient coding, an advanced multiple transform (AMT)+4×4 non-separable secondary transform (NSST), an affine motion model, a generalized adaptive loop filter (GALF), an advanced temporal motion vector prediction (ATMVP), an adaptive motion vector precision, a decoder-side motion vector refinement (DMVR) and/or a linear model (LM) chroma mode.

Figure 2:
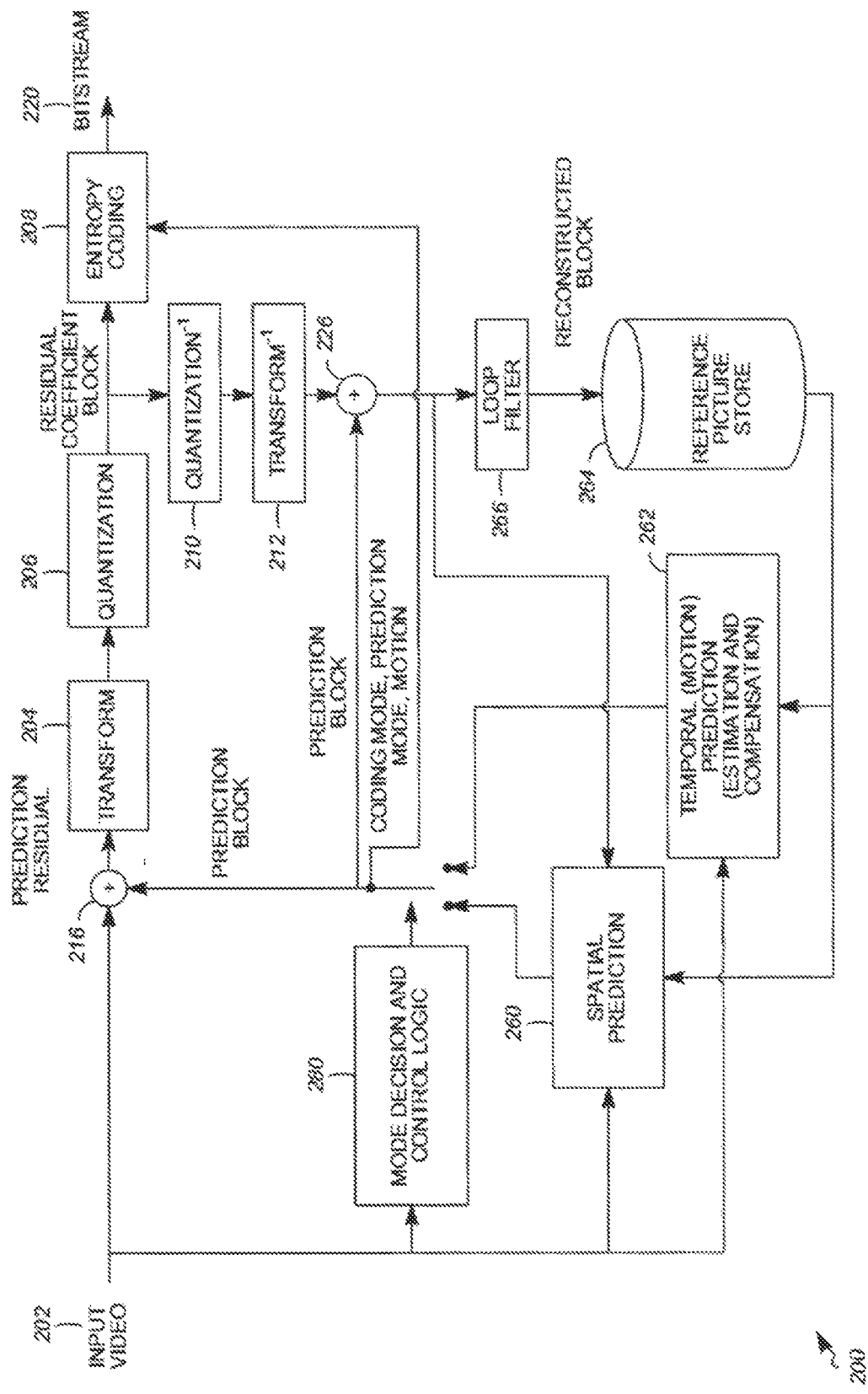
FIG. 2 shows an example diagram of a block-based video encoder.
Figure 4:
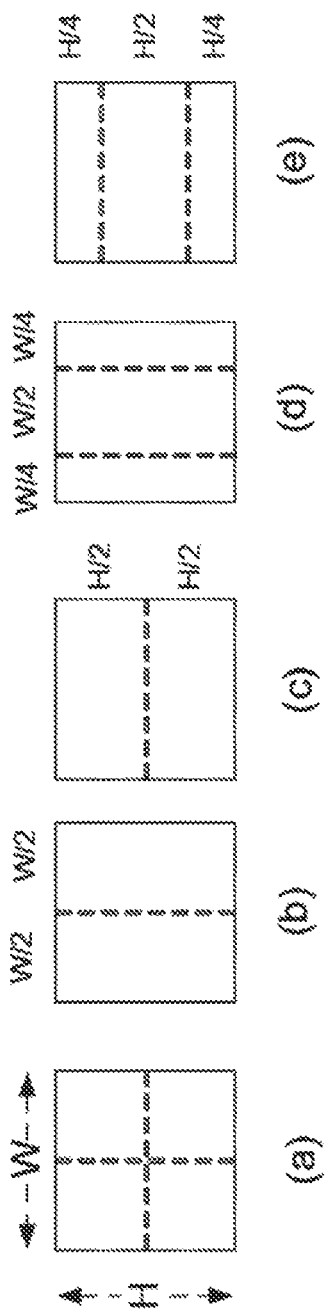
FIG. 4 shows example block partitions in a multi-type tree structure.

An example block-based video coding system may include a block-based hybrid video coding framework. FIG. 2 illustrates an example block-based hybrid video encoding framework 200 for an encoder. As illustrated in FIG. 2, an input video signal 202 may be processed block-by-block. A block may be referred to as coding unit (CU). CU may also be referred as a video block. For example, a CU may up to 128×128 pixels in size. In a coding framework, a CU may be partitioned into prediction units (PUs), and/or separate predictions may be used. In a coding framework, a CU may be used as a basic unit for both prediction and transformation without further partitions. A CTU may be partitioned into CUs, for example, to adapt varying local characteristics based on quad/binary/ternary-tree structure. In a multi-type tree structure, a CTU may be partitioned by a quad-tree structure. A quad-tree leaf node may be further partitioned by a binary and ternary tree structure. As illustrated in FIG. 4, one or more splitting types may be provided including, for example, quaternary partitioning (FIG. 4(a)), horizontal binary partitioning (FIG. 4(c)), vertical binary partitioning (FIG. 4(b)), vertical ternary partitioning (FIG. 4(d)), and horizontal ternary partitioning (FIG. 4(e)).

As illustrated in FIG. 2, for an input video block (e.g., macroblock (MB) and/or a CU), spatial prediction 260 and/or temporal prediction 262 may be performed. Spatial prediction 260 (e.g., intra prediction) may use pixels from samples of coded neighboring blocks (e.g., reference samples) in the video picture/slice to predict the current video block. The spatial prediction 260 may reduce spatial redundancy, for example, that may be inherent in the video signal. Motion prediction 262 (e.g., inter prediction and/or temporal prediction) may use reconstructed pixels from the coded video pictures, for example, to predict the current video block. The motion prediction 262 may reduce temporal redundancy, for example, that may be inherent in the video signal. Motion prediction signals (e.g., a temporal prediction signal) for a video block (e.g., a CU) may be signaled by one or more motion vectors (MVs). The MVs may indicate the amount and/or the direction of motion between the current block and/or the current block's reference block or its temporal reference. If multiple reference pictures are supported for a (e.g., each) video block, the video block's reference picture index may be sent by an encoder. The reference picture index may be used to identify from which reference picture in a reference picture store 264 the motion prediction signal may derive.

After the spatial prediction 260 and/or motion prediction 262, a mode decision block 280 in the encoder may determine a prediction mode (e.g., the best prediction mode), for example, based on a rate-distortion optimization. The prediction block may be subtracted from a current video block at 216, and/or the prediction residual may be de-correlated using a transform 204 and/or a quantization 206 to achieve a bit-rate, such as a target bit rate. The quantized residual coefficients may be inverse quantized at the inverse quantization 210 and/or inverse transformed at transform 212, for example, to form the reconstructed residual, which may be added to the prediction block at 226, for example, to form a reconstructed video block. In-loop filtering (e.g., a de-blocking filter and/or adaptive loop filters) may be applied at loop filter 266 on the reconstructed video block before the reconstructed video block may be put in the reference picture store 264 and/or used to code video blocks (e.g., future video blocks). To form the output video bit-stream 220, coding mode (e.g., inter or intra), prediction mode information, motion information, and/or quantized residual coefficients may be sent (e.g., may all be sent) to an entropy coding module 208, for example, to be compressed and/or packed to form the bit-stream.

Figure 3:
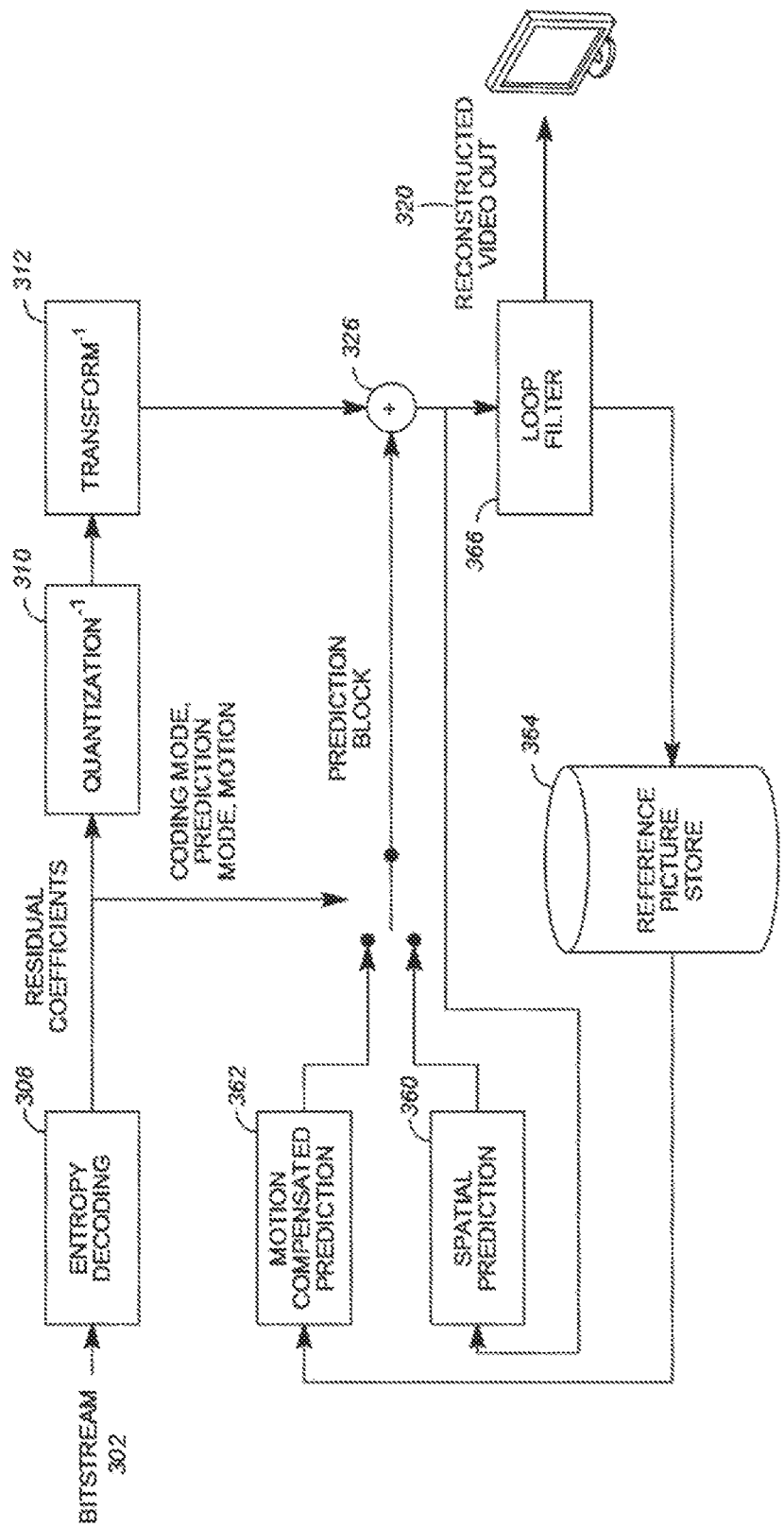
FIG. 3 shows an example block diagram of a video decoder.

FIG. 3 illustrates a block diagram of an example block-based video decoding framework for a decoder. A video bit-stream 302 (e.g., the video bit-stream 220 in FIG. 2) may be unpacked (e.g., first unpacked) and/or entropy decoded at an entropy decoding module 308. The coding mode and prediction information may be sent to a spatial prediction module 360 (e.g., if intra coded) and/or to a motion compensation prediction module 362 (e.g., if inter coded and/or temporal coded) to form a prediction block. Residual transform coefficients may be sent to an inverse quantization module 310 and/or to an inverse transform module 312, e.g., to reconstruct the residual block. The prediction block and/or the residual block may be added together at 326. The reconstructed block may go through in-loop filtering at a loop filter 366, for example, before the reconstructed block is stored in a reference picture store 364. The reconstructed video 320 in the reference picture store 364 may be sent to drive a display device and/or used to predict video blocks (e.g., future video blocks).

As described herein, affine motion compensation may be used as an inter-coding tool.

Various affine modes and affine motion models for video coding may be used, as described herein. A translation motion model may be applied for motion-compensated prediction. Various kinds of motions (e.g., zoom in or zoom out, rotation, perspective motions, and/or other irregular motions) may exist. An affine transform (e.g., a simplified affine transform) motion-compensated prediction may be applied for prediction. A flag for inter-coded CUs (e.g., each inter-coded CU) may be signaled, for example, to indicate whether a translation motion or an affine motion model is applied for inter prediction.

A simplified affine motion model may be a four-parameter model. Out of the four parameters of the model, two parameters may be used for translation movement (e.g., in horizontal direction and vertical direction), one parameter may be used for zoom motion, and one parameter may be used for rotation motion. A horizontal zoom parameter value may be equal to a vertical zoom parameter value. A horizontal rotation parameter value may be equal to a vertical rotation parameter value. A four-parameter motion model may be coded using two motion vectors as a pair of motion vectors, at two control point positions, for example, at the top-left corner position and the top-right corner position of a current video block or a current CU. As illustrated in FIG. 5, an affine motion field of a CU or a block may be described by two control point motion vectors (e.g., $\vec{V0}, \vec{V1}$). Based on control point motion, a motion field $(v_x, v_y)$ may be determined as follows:

$$v_x = \frac{(v_{1x} - v_{0x})}{w}x - \frac{(v_{1y} - v_{0y})}{w}y + v_{0x} \qquad (1)$$

$$v_y = \frac{(v_{1y} - v_{0y})}{w}x + \frac{(v_{1x} - v_{0x})}{w}y + v_{0y}$$

where $(v_{0x}, v_{0y})$ may be a motion vector of the top-left corner control point, and $(v_{1x}, v_{1y})$ may be a motion vector of the top-right corner control point. When a block is coded in affine mode, its motion field may be derived based on, for example, the granularity of sub-block. A motion vector of a sub-block (e.g., each sub-block) may be derived by calculating the motion vector of the center sample of the sub-block using Equation (1), for example. The motion vector may be rounded to an accuracy value (e.g., $\frac{1}{16}$-pel accuracy). The derived motion vector may be used at the motion compensation stage to generate a prediction signal of a sub-block (e.g., each sub-block) inside the current block. The size of the sub-block that is applied for affine motion compensation may be calculated using the following equations:

$$\begin{cases} M = \text{clip3}\left(4, w, \frac{w}{4 \cdot \max(\text{abs}(v_{1x} - v_{0x}), \text{abs}(v_{1y} - v_{0y}))}\right) \\ N = \text{clip3}\left(4, h, \frac{h}{4 \cdot \max(\text{abs}(v_{2x} - v_{0x}), \text{abs}(v_{2y} - v_{0y}))}\right) \end{cases} \qquad (2)$$

where $(v_{2x}, v_{2y})$ may be the motion vector of the bottom-left control point, w and h may be CU width and CU height, e.g., as calculated by Equation (1), and M and N may be the width and the height of the derived sub-block size.

Affine merge mode coding may be used to code a CU. Two sets of motion vectors associated with two control points for each reference picture list may be signaled with predictive coding. Affine merge mode may be applied and the differences between a motion vector and its predictor may be coded using a lossless coding scheme. The signaling overhead that may be significant (e.g., at a low bit rate) may be signaled. Affine merge mode may be applied to reduce the signaling overhead, for example, by considering the local continuity of the motion field. Motion vectors at two control points of a current CU may be derived. The motion vectors of a current CU may be derived using the affine motion of the CU's affine merge candidate that may be selected from its neighboring blocks.

Figure 6:
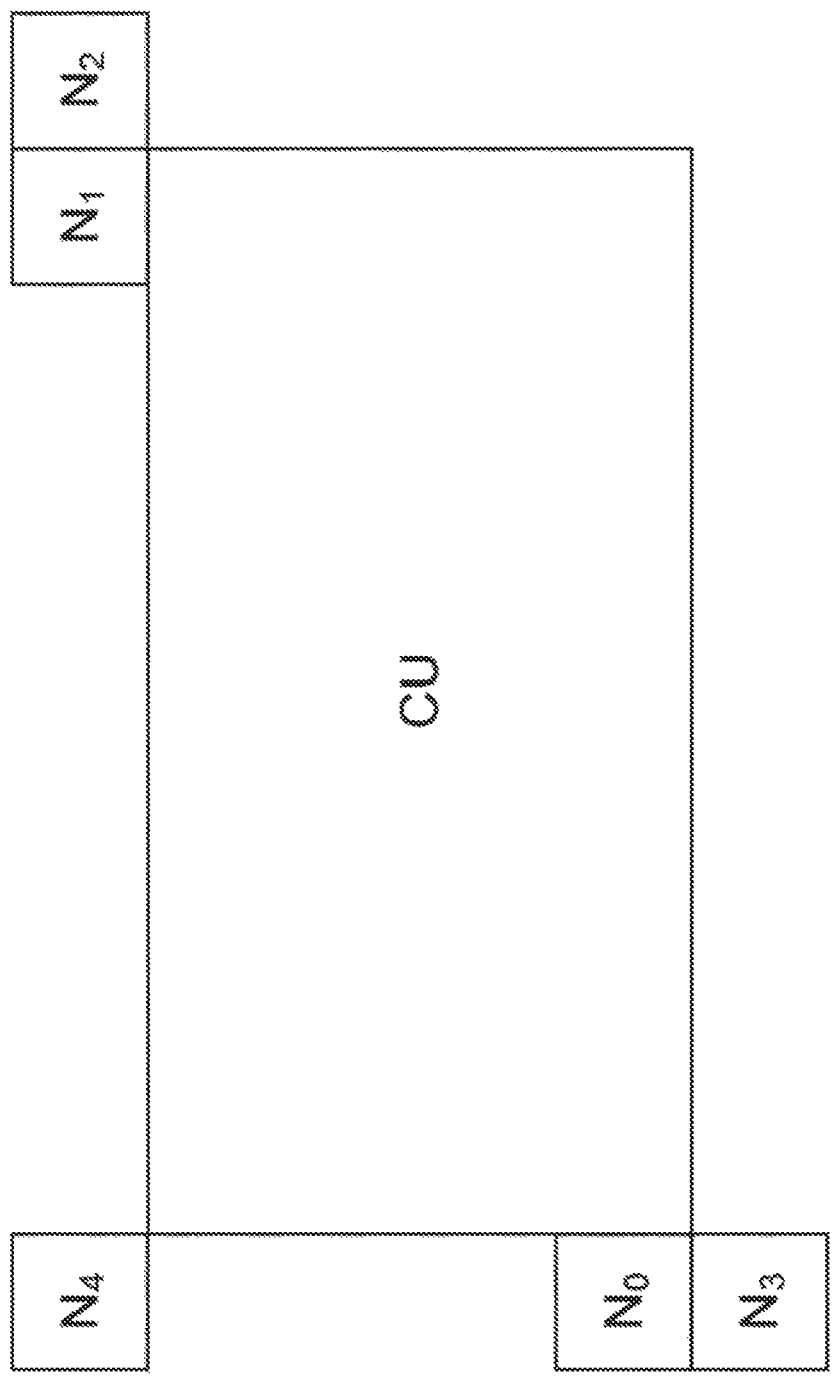
FIG. 6 shows an example of affine merge candidates.

As illustrated in FIG. 6, for example, a current CU coded with affine merge mode may have five neighboring blocks ($N_0$ to $N_4$). The neighboring blocks may be checked in order from $N_0$ to $N_4$-$N_0$, $N_1$, $N_2$, $N_3$, $N_4$. The first affine coded neighboring block may be used as an affine merge candidate.

Figure 7:
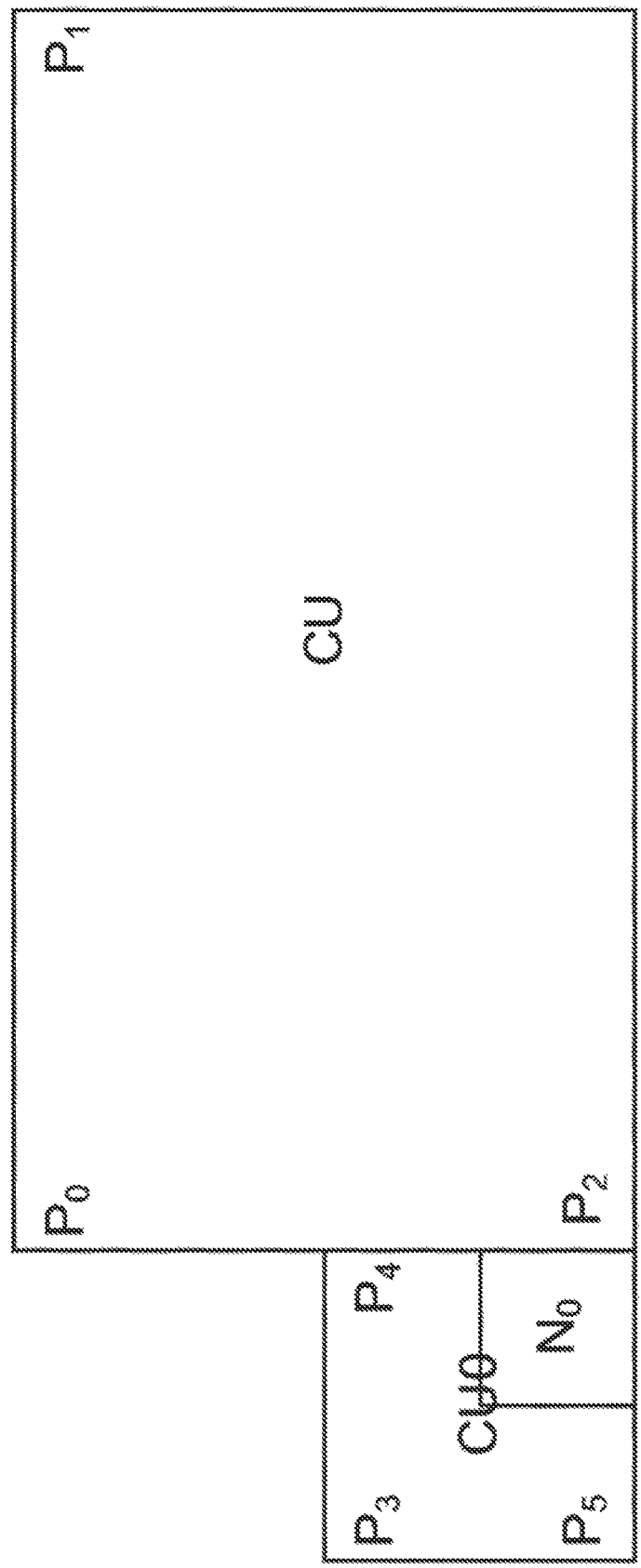
FIG. 7 shows an example motion vector derivation at control points for an affine motion model.

As illustrated in FIG. 7, a current CU may be coded with affine merge mode. The bottom-left neighboring block of the current CU (e.g., $N_0$) may be selected as an affine merge candidate. The bottom-left neighboring block, $N_0$ may belong to a neighboring CU, CU0. The width and height of the CU containing block $N_0$ may be denoted as nw and nh. The width and height of the current CU may be denoted as cw and ch. The MV at position $P_1$ may be denoted as $(v_{1x}, v_{1y})$. The MV $(v_{0x}, v_{0y})$ at control point $P_0$ may be derived according to the following equations:

$$v_{0x} = v_{3x} + (v_{4x} - v_{3x}) * \frac{(x_0 - x_3)}{nw}(v_{4y} - v_{3y}) * \frac{(y_0 - y_3)}{nw} \qquad (3)$$

$$v_{0y} = v_{3y} + (v_{4y} - v_{3y}) * \frac{(x_0 - x_3)}{nw} + (v_{4x} - v_{3x}) * \frac{(y_0 - y_3)}{nw} \qquad (4)$$

The MV $(v_{1x}, v_{1y})$ at control point $P_1$ may be derived according to the following equations:

$$v_{1x} = v_{0x} + (v_{4x} - v_{3x}) * \frac{cw}{nw} \qquad (5)$$

$$v_{1y} = v_{0y} + (v_{4y} - v_{3y}) * \frac{cw}{nw}. \qquad (6)$$

The MV $(v_{2x}, v_{2y})$ at control point $P_2$ may be derived according to the following equations:

$$v_{2x} = v_{0x} - (v_{4y} - v_{3y}) * \frac{ch}{nw} \qquad (7)$$

$$v_{2y} = v_{0y} + (v_{4x} - v_{3x}) * \frac{ch}{nw}. \qquad (8)$$

Once the MVs at the two control points (e.g., $P_0$ and $P_1$) are determined, the MV of a sub-block (e.g., each sub-block) within the current CU may be derived. The derived MV of the sub-block may be used for sub-block based motion compensation and temporal motion vector prediction for future picture coding.

Affine MV prediction may be performed. For non-merge affine coded CUs, the signaling of MVs at control points may be associated with high signaling cost. Predictive coding may be used to reduce signaling overhead. Affine MV predictor may be generated from the motion of its neighboring coded blocks. Various kinds of predictors may be supported for MV prediction of an affine coded CU. For example, the generated affine motion predictor from neighboring blocks of control points and/or translation motion predictor used for MV prediction. The translation motion predictor may be used as a supplement to the affine motion predictor.

Figure 8:
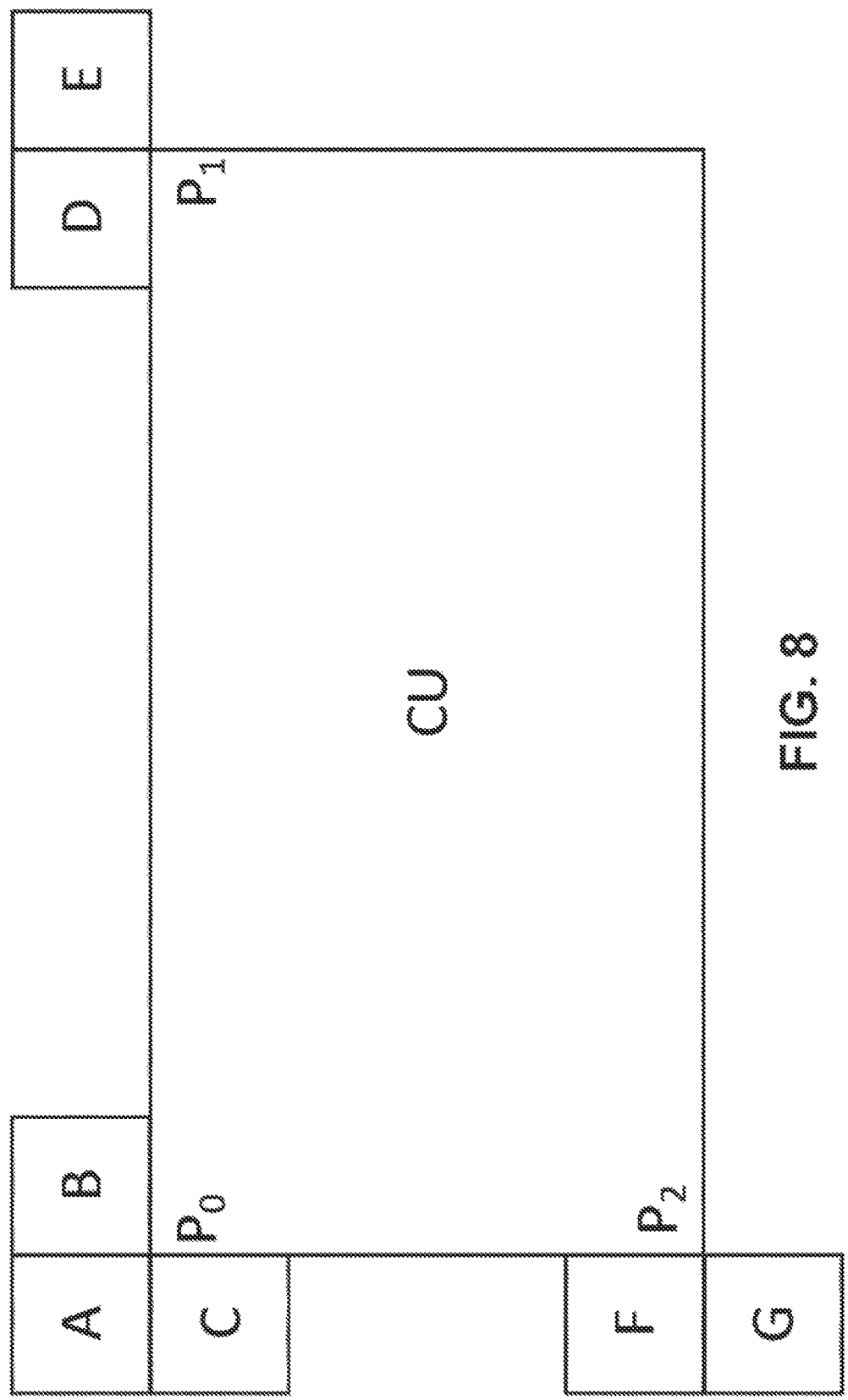
FIG. 8 shows an example of affine motion predictor construction.
Figure 9:
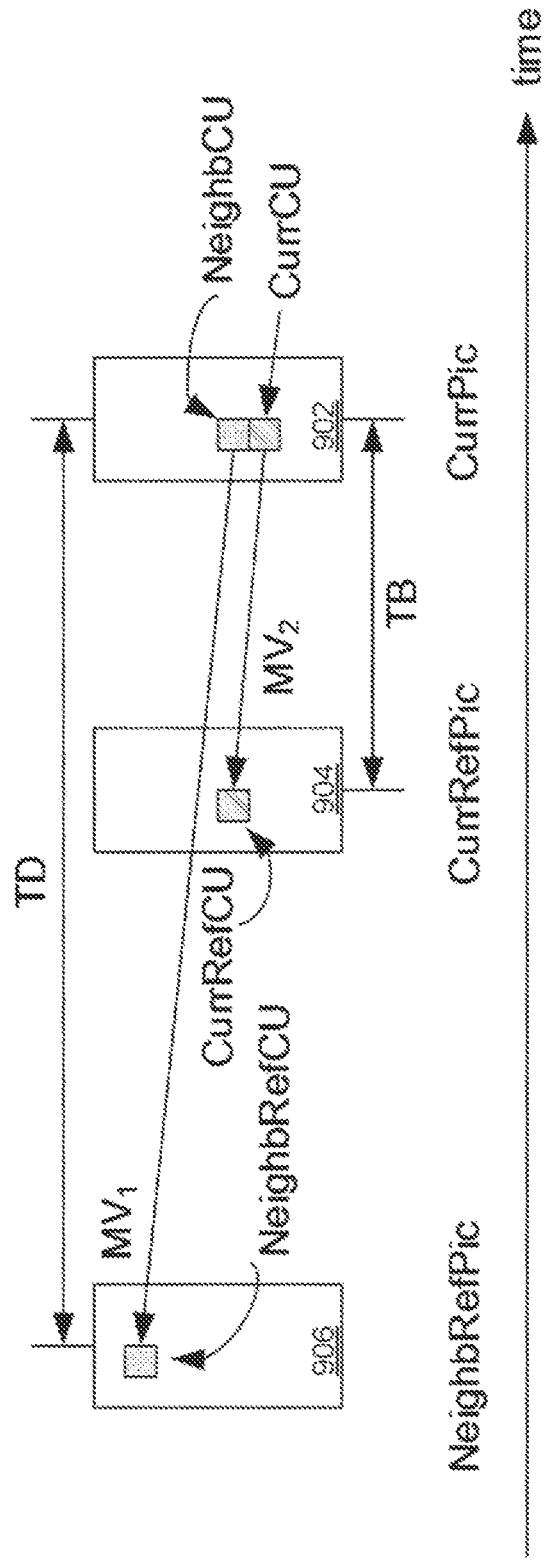
FIG. 9 shows an example of motion vector (MV) temporal scaling for affine MV predictor generation.

Sets of MVs may be obtained and used to generate multiple affine motion predictors. As illustrated in FIG. 8, MV sets may include the following: MV from neighboring blocks {A, B, C} at corner $P_0$, which may include set S1 and may be denoted as {$MV_A$, $MV_B$, $MV_C$}: MV from neighboring blocks {D, E} at corner $P_1$, which may include set S2 and may be denoted as {$MV_C$, $MV_E$}; and/or MV from neighboring blocks {F, G} at corner $P_2$, which may include set S3 and may be denoted as {$MV_F$, $MV_G$}. An MV from a neighboring block may be derived as follows. A spatial neighboring block may be checked, for example, if the neighboring block is an inter coding block. The MV may be used directly. The reference picture of the neighboring block may be the same as the reference picture of the current CU. The MV may be scaled according to temporal distance, e.g. if the reference picture of the neighboring block is different from the reference picture of the current CU. As illustrated in FIG. 9, the temporal distance between the current picture 902 and the reference picture 904 of the current CU may be denoted as TB. The temporal distance between the current picture 902 and the reference picture of the neighboring block 906 may be denoted as TD. The $MV_1$ of the neighboring block may be scaled using the following:

$$MV_2 = MV_1 \cdot \frac{TB}{TD} \qquad (9)$$

where $MV_2$ may be used in the motion vector set.

The collocated block in the collocated reference picture may be checked, for example, if the neighboring block is not an inter coding block. The MV may be scaled according to Equation (9) based on temporal distance, for example, if the temporal collocated block is an inter coding block. The MV in the neighboring block may be set to zero, for example, if the temporal collocated block is not an inter coding block.

An affine MV predictor may be generated by selecting an MV from a set of MVs. For example, there may be three sets of MVs, e.g., S1, S2, and S3. The sizes of S1, S2, and S3 may be 3, 2, and 2, respectively. In such an example, there may be 12 (e.g., 3×2×2) possible combinations. A candidate MV may be discarded, for example, if the magnitude of zoom or rotation related parameters represented by one or more MVs is larger than a threshold value. The threshold value may be predefined. A combination may be denoted as ($MV_0$, $MV_1$, $MV_2$) for three corners of the CU, e.g., top-left, top-right, and bottom-left. A condition MV may be checked as follows:

$$(|(v_{1x}-v_{0x})|>T*w) \text{ or } (|(v_{1y}-v_{0y})|>T*h)$$

or $$(|(v_{2x}-v_{0x})|>T*w) \text{ or } (|(v_{2y}-v_{0y})|>T*h) \qquad (10)$$

where T may be ½. The candidate MV may be discarded, for example, if the condition is satisfied (e.g., the zoom or rotation is too large).

The remaining candidates may be sorted. A triplet of three MVs may represent a 6-parameter motion model (e.g., including translation, zoom, and rotation in horizontal and vertical directions). The ordering criteria may be the difference between the 6-parameter motion model and the 4-parameter motion model represented by ($MV_0$, $MV_1$). The candidate with a smaller difference may have a smaller index in the ordered candidate list. The difference between the affine motion represented by ($MV_0$, $MV_1$, $MV_2$) and the affine motion model represented by ($MV_0$, $MV_1$) may be evaluated according to the following equation:

$$D=|(v_{1x}-v_{0x})*h-(v_{2y}-v_{0y})*w|+|(v_{1y}-v_{0y})*h+(v_{2x}-v_{0x})*w| \qquad (11)$$

An affine motion model may be used to increase coding efficiency. For example, the MVs at two control points may be signaled for a large CU. The motion vector for the sub-block within the CU may be interpolated. The motion for sub-blocks (e.g., each sub-block) may be different, for example, due to zoom or rotation movement. Control points may be fixed. e.g., in an affine motion model when a coding block chooses affine motion model instead of a translation motion model. The control points utilized may be fixed, for example, top-left and top-right corners of the coding block. The motion vector precision for affine MV may be fixed (e.g., ¼ pel). When sub-block's vertical position y is greater than the block width (w) in Eq. (1), the up scaling (y/w) may be utilized.

While using the affine merge mode, the first available neighboring block from {$N_0$, $N_1$, $N_2$, $N_3$, $N_4$} may not be the best one. From affine MV derivation from merge candidate (e.g., as provided in Eq. ( ) to ( )), accuracy may be related to the width of merge candidate (e.g., as illustrated by "nw" in Eq. ( ) to ( )). The first affine merge candidate may not have the best accuracy for the affine MV derivation. In affine MV prediction, the condition checking, based on Equation (10) may discard the candidate with large zoom or rotation. The discarded candidates may be added back to the list.

Systems, methods, and instrumentalities for affine motion model based coding may be disclosed herein. An adaptive control point selection based affine motion coding may be used, as disclosed herein. In adaptive control point selection based affine motion coding, a control point position may be adaptively selected based on a shape of a block. For example, one or more control points may be selected based on whether a block is a horizontal rectangular block, a vertical rectangular block, or a square block. An affine merge candidate may be selected from neighboring blocks based on a distance between two control points. For example, an affine merge candidate with the highest control point distance may be selected. Affine predictor generation may be performed such that candidates with large zoom or rotation movement may be placed at the back of a predictor list.

Affine motion based coding with adaptive control point selection may be used. For a video block that is coded in affine mode, for example, top-left and top-right corners of a video block may be used as control points. The motion of a sub-block (e.g., each sub-block associated with the video block) may be derived using the MVs at the two control points, for example, based on Equation (1). Derivation accuracy may be related to block width (e.g., the distance between the two control points). Some sub-blocks may be far from the two control points (e.g., $P_0$ and $P_1$ as illustrated by video block 1010 of FIG. 10). Derived motion using MV at $P_0$ and $P_1$ may, therefore, be affected.

Shape dependent control point selection may be performed. Video blocks may be classified into categories, for example, a horizontal rectangular block, a vertical rectangular block, or a square block. For example, a block may be classified as horizontal rectangular if the width of the block is greater than the height. The control points for a horizontal rectangular block may be defined by the top-left corner (e.g., $P_0$) and the top-right corner (e.g., $P_1$), for example, as illustrated by block 1010 of FIG. 10. A block may be classified as vertical rectangular if the width of the block is smaller than the height. The control points for a vertical rectangular block may be defined by the top-left corner (e.g., $P_0$) and the bottom-left corner (e.g., $P_2$), for example, as illustrated by block 1020 of FIG. 10. A block may be classified as a square block, for example, if the width of the block is equal to the height. The control points for a square block may be defined by the top-right corner (e.g., $P_1$) and the bottom-left corner (e.g., $P_2$), for example, as illustrated by block 1030 of FIG. 10.

For a horizontal rectangular block, control points $P_0$ and $P_1$ may be used. The MV of a sub-block for a horizontal rectangular block may be derived based on Equation (1).

For a vertical rectangular block, control points $P_0$ and $P_2$ may be used. MV of a sub-block for a vertical rectangular block may be derived as follows. Assuming that the position of the center of the sub-block relative to the top-left corner of the block is denoted by (x, y), and the MV of the sub-block centered at (x,y) is denoted by ($v_x$, $v_y$). Further, assuming that the block width is denoted as w and the block height is denoted as h, and the MVs at $P_0$ and $P_2$ are denoted as ($v_{0x}$, $v_{0y}$), ($v_{2x}$, $v_{2y}$), the MVs of a sub-block of a horizontal regular block centered at (x,y) are derived as follows:

$$v_x = v_{0x} + (v_{2y} - v_{0y}) * \frac{x}{h} + (v_{2x} - v_{0x}) * \frac{y}{h} \quad (12)$$

$$v_y = v_{0y} - (v_{2x} - v_{0x}) * \frac{x}{h} + (v_{2y} - v_{0y}) * \frac{y}{h} \quad (13)$$

For a square block, control points $P_1$ and $P_2$ may be used. The MV of a sub-block belonging to the square block may be derived as follows:

$$v_x = v_{1x} + a*(x-w) - b*y \quad (14)$$

$$v_y = v_{1y} + b*(x-w) + a*y \quad (15)$$

where a and b may be calculated as follows:

$$a = (-(v_{2x}-v_{1x})*w + (v_{2y}-v_{1y})*h)/(w*w + h*h) \quad (16)$$

$$b = (-(v_{2x}-v_{1x})*h - (v_{2y}-v_{1y})*w)/(w*w + h*h) \quad (17)$$

Given that w is equal to h in case of a square block, a and b may be simplified as follows:

$$a = (-(v_{2x}-v_{1x}) + (v_{2y}-v_{1y}))/(2w) \quad (18)$$

$$b = (-(v_{2x}-v_{1x}) - (v_{2y}-v_{1y}))/(2w) \quad (19)$$

A mode indicating the control point selection for an affine coded CU may be signaled. For example, for an affine coded CU, a mode may be signaled indicating which control points are being used. For example, the mode may indicate that the control points $P_0$, $P_1$ are being used in horizontal direction, or that the control points $P_0$, $P_2$ are being used in vertical direction, or that the control points $P_1$, $P_2$ are being used in diagonal direction. The control point mode may be determined based on motion estimation cost or rate distortion cost. For example, for a video block (e.g., each block), the encoder may try affine motion estimation using different control point selection modes to get the prediction error for each possible control point selection. The encoder may choose the mode with the lowest motion estimation cost, for example, by summing the motion prediction distortion and the control point MV bit cost.

Figure 11:
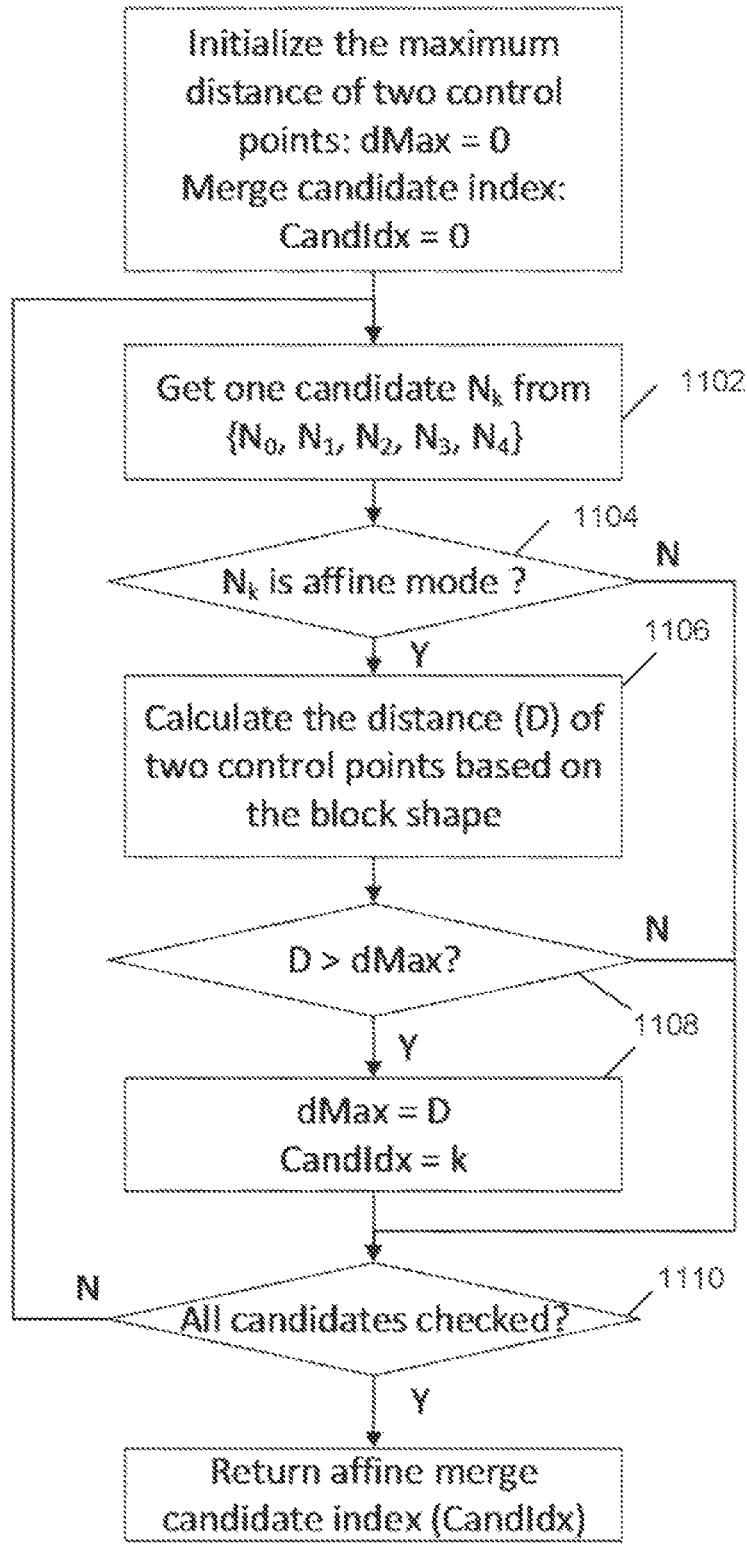
FIG. 11 shows an example of affine merge selection with maximum control point distance.

Affine merge candidate selection with maximum control point distance may be used. MV at a control point of a current video block may be derived from the MVs of a merge candidate using Equations (3)-(8). The accuracy of the motion vector derivation may depend on the distance between two control points of its neighboring block. The distance between two control points may be the width of the block. In shape dependent control point selection as described herein, the distance between two control points may be measured based on the block shape. The square of the distance between two control points may be used to select an affine merge candidate from a neighboring block, e.g. {$N_0$, $N_1$, $N_2$, $N_3$, $N_4$} as illustrated in FIG. 6. Accuracy for motion derivation for a current block may be higher, for example, if the distance is larger. The affine merge candidate with the maximum control point distance may be selected to derive the MVs, for example, as illustrated in FIG. 11. Affine merge candidates (e.g., all affine merge candidates) in a candidate list may be checked in order, as for example, as illustrated in FIG. 6. As illustrated in FIG. 11, at 1102, a candidate neighboring block Nk may be selected from a list of available neighboring blocks. At 1104, the selected neighboring block Nk may be checked for affine mode. After checking that the affine mode is enabled for the selected neighboring block Nk, at 1106, distance, D between the two control points may be calculated. The distance D may be calculated based on the block shape. At 1106, the merge candidate with the maximum control point distance may be selected as the affine merge candidate for the current block to derive MVs at control points of the current block. At 1110, a check is made that all the candidates have been evaluated.

An affine merge index may be signaled. The distance between two control points may be used to order the available merge candidates in a merge candidate list. A final affine merge candidate may be derived in the following manner. Available affine merge candidates (e.g., all available affine merge candidates) may be obtained from neighboring blocks. The distance between two control points may be calculated for candidates (e.g., each candidate) in the list. The affine merge candidate list may be ordered, for example, in descending order of control point distance. A final affine merge candidate may be chosen from the ordered list using the merge index signaled for the coding block.

Affine MV prediction may be performed as described herein. Candidate ordering in affine MV predictor generation may be performed, for example, by performing by checking condition (10) or using the criteria as provided in the following equation:

$$D = \max(|(v_{1x}-v_{0x})*h - (v_{2y}-v_{0y})*w|, |(v_{1y}-v_{0y})*h + (v_{2x}-v_{0x})*w|) + A1 + A2 \quad (20)$$

where A1 and A2 may be adjustment if zoom or rotation movement is too large. A1 and A2 may be calculated using the following equations:

$$A1 = \begin{cases} w*T2; & \text{if } (|v_{1x} - v_{0x}| > T1*w) \text{ or } (|v_{1y} - v_{0y}| > T1*w) \\ 0; & \text{otherwise} \end{cases} \quad (21)$$

$$A2 = \begin{cases} h*T2; & \text{if } (|v_{2x} - v_{0x}| > T1*h) \text{ or } (|v_{2y} - v_{0y}| > T1*h) \\ 0; & \text{otherwise} \end{cases} \quad (22)$$

where T1 and T2 may be pre-defined thresholds (e.g., T1=3, T2=¼), and w and h may be the width and height of the coding block. Using the ordering criteria as provided in Equation (20), the candidates with large zoom or rotation movements may be placed at the back of the predictor list.

Unified control-point MVs for affine motion compensation, motion vector prediction, and/or deblocking may be used. As described herein, when affine mode is enabled, a CU may be divided into a number of sub-blocks having equal size (e.g., 4×4 sub-blocks). A sub-block (e.g., each sub-block) may be assigned an MV (e.g., one unique MV) that may be derived using an affine mode. For example, the affine mode may be the 4-parameter affine mode or the 6-parameter affine mode. The affine mode may be signaled at the CU-level. The center position of a sub-block (e.g., each sub-block) may be used to derive a corresponding MV of the sub-block based on the selected affine mode. The MV ($v_x^{i,j}$, $v_y^{i,j}$) of the (i, j) sub-block may be derived from the three control-point MVs $v_0$, $v_1$ and $v_2$ at the top left, top right and bottom left corners of an affine CU as follows:

$$v_x^{i,j} = \frac{(v_{1x} - v_{0x})}{w} \cdot \left(i \cdot w_{sb} + \frac{w_{sb}}{2}\right) + \frac{(v_{2x} - v_{0x})}{h} \cdot \left(j \cdot h_{sb} + \frac{h_{sb}}{2}\right) + v_{0x} \quad (23)$$

-continued $$v_y^{i,j} = \frac{(v_{1y} - v_{0y})}{w} \cdot \left(i \cdot w_{sb} + \frac{w_{sb}}{2}\right) + \frac{(v_{2y} - v_{0y})}{h} \cdot \left(j \cdot h_{sb} + \frac{h_{sb}}{2}\right) + v_{0y}$$

$$i = 0, 1, \ldots, \frac{w}{w_{sb}} - 1$$

$$j = 0, 1, \ldots, \frac{h}{h_{sb}} - 1$$

where (i, j) may be the horizontal and vertical indices of the sub-block inside the CU; $w_{sb}$ and $h_{sb}$ may be the width and height of a (e.g., one) sub-block (e.g., which may be equal to 4). A CU may have one or more sub-locks that may not include the control-point positions. For example, the top left and top right positions for the 4-parameter affine mode, and the top left, top right and bottom-left positions for the 6-parameter mode may not include the control-point positions. The MVs in such a case may be calculated as provided in Equation (23). These MVs may be used to generate the prediction samples of the sub-block during motion compensation. The MVs may be used to predict the MVs of the spatial and temporal neighboring blocks of the CU. The MVs may be used to calculate the boundary strength value that is used for the de-blocking filter. For the sub-blocks located at the control-point positions, their MVs may be used as the seeds to derive the control-point MVs of their neighboring blocks through affine merge mode. To maintain the MV precision of affine merge mode, the MV in Equation (23) may be used at the motion compensation for a control-point sub-block (e.g., each control-point sub-block). For spatial/temporal MV prediction and de-blocking, their MVs may be replaced by the corresponding control-point MVs. For example, for a CU that is coded by 4-parameter affine model, the MVs of its top left and top right sub-blocks that may be used for MV prediction and de-blocking may be calculated as follows:

$$v_x^{0,0} = v_{0x}, v_y^{0,0} = v_{0y} \qquad (24)$$

$$v_x^{\frac{w}{w_{sb}}-1,0} = v_{1x}, v_y^{\frac{w}{w_{sb}}-1,0} = v_{1y}$$

For a CU that is coded with a 6-parameter affine mode, the MVs of the top left, top right and bottom left sub-blocks that may be used for MV prediction and/or deblocking may be calculated as follows:

$$v_x^{0,0} = v_{0x}, v_y^{0,0} = v_{0y} \qquad (25)$$

$$v_x^{\frac{w}{w_{sb}}-1,0} = v_{1x}, v_y^{\frac{w}{w_{sb}}-1,0} = v_{1y}$$

$$v_x^{0,\frac{h}{h_{sb}}-1} = v_{2x}, v_y^{0,\frac{h}{h_{sb}}-1} = v_{2y}$$

Figure 12:
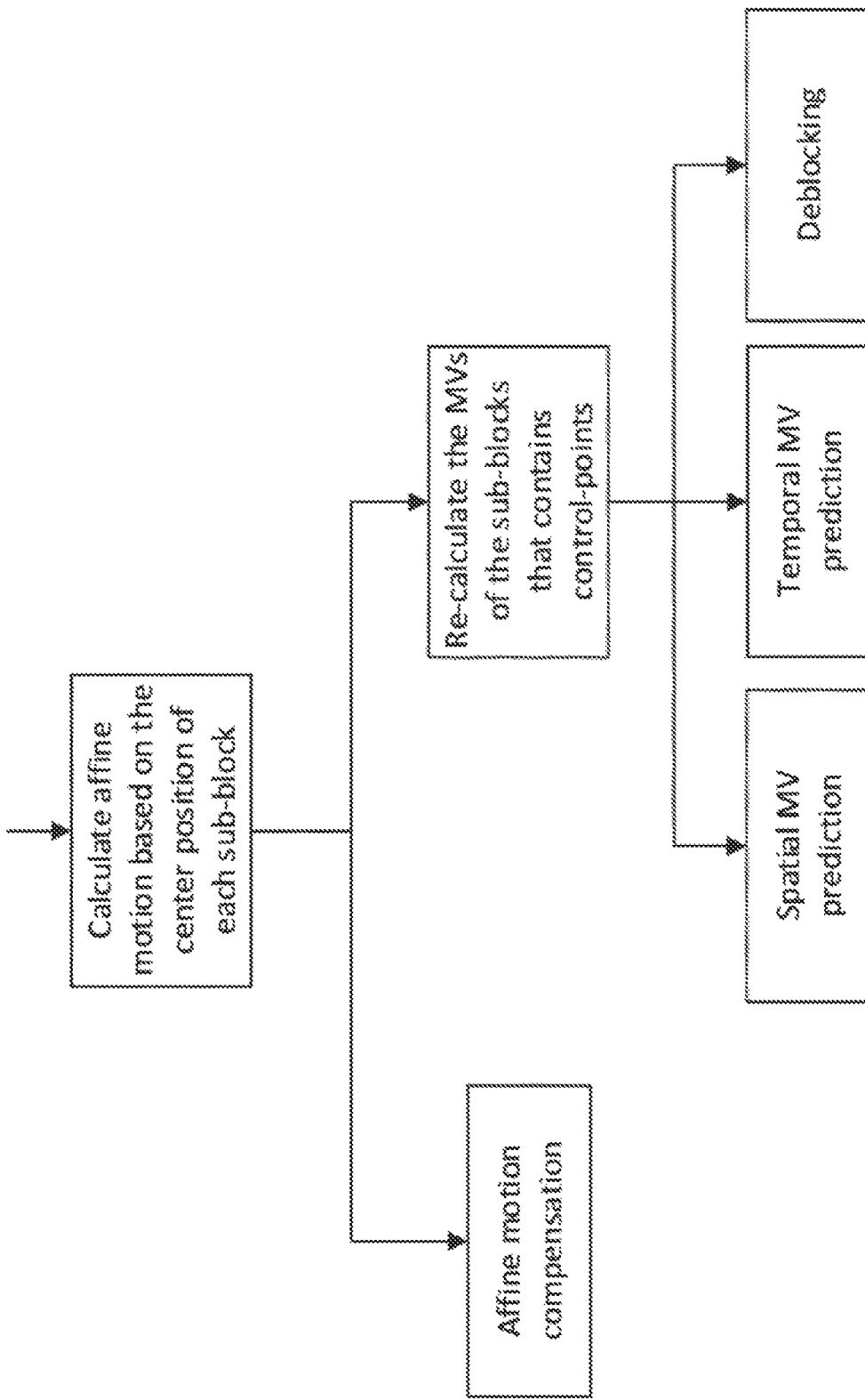
FIG. 12 shows an example workflow of motion field generation for affine mode.

FIG. 12 illustrates an example of generating the motion field of the CUs that may be coded with an affine mode. Based on the workflow illustrated in FIG. 12, the MV precisions of affine motion compensation and MV prediction may be maintained. The workflow illustrated in FIG. 12 may be used in many ways. For example, for a sub-block (e.g., each sub-block associated with a CU) that comprises a control-point position of the CU, one or more different MVs may be derived and/or stored. In an example, an MV may be derived based on Equation (23) and may be used to generate the prediction samples of the sub-block. In an example, an MV may be derived based on Equations (24) and (25) and may be used for MV prediction and de-blocking.

For a sub-block (e.g., each sub-block) at a control point position, its MV may be set (e.g., initially set) to the corresponding control-point MV. The MV may be set to the corresponding control-point MV to derive the MVs of its neighboring blocks at parsing stage. At the motion compensation stage, the MV of the sub-block may be re-calculated by using the center position as the input to the selected affine model. One or more different MVs may be stored for a sub-block at a control-point position (e.g., each control-point position). The MV for a sub-block at a control-point position (e.g., each control-point position) may be derived twice.

Figure 13:
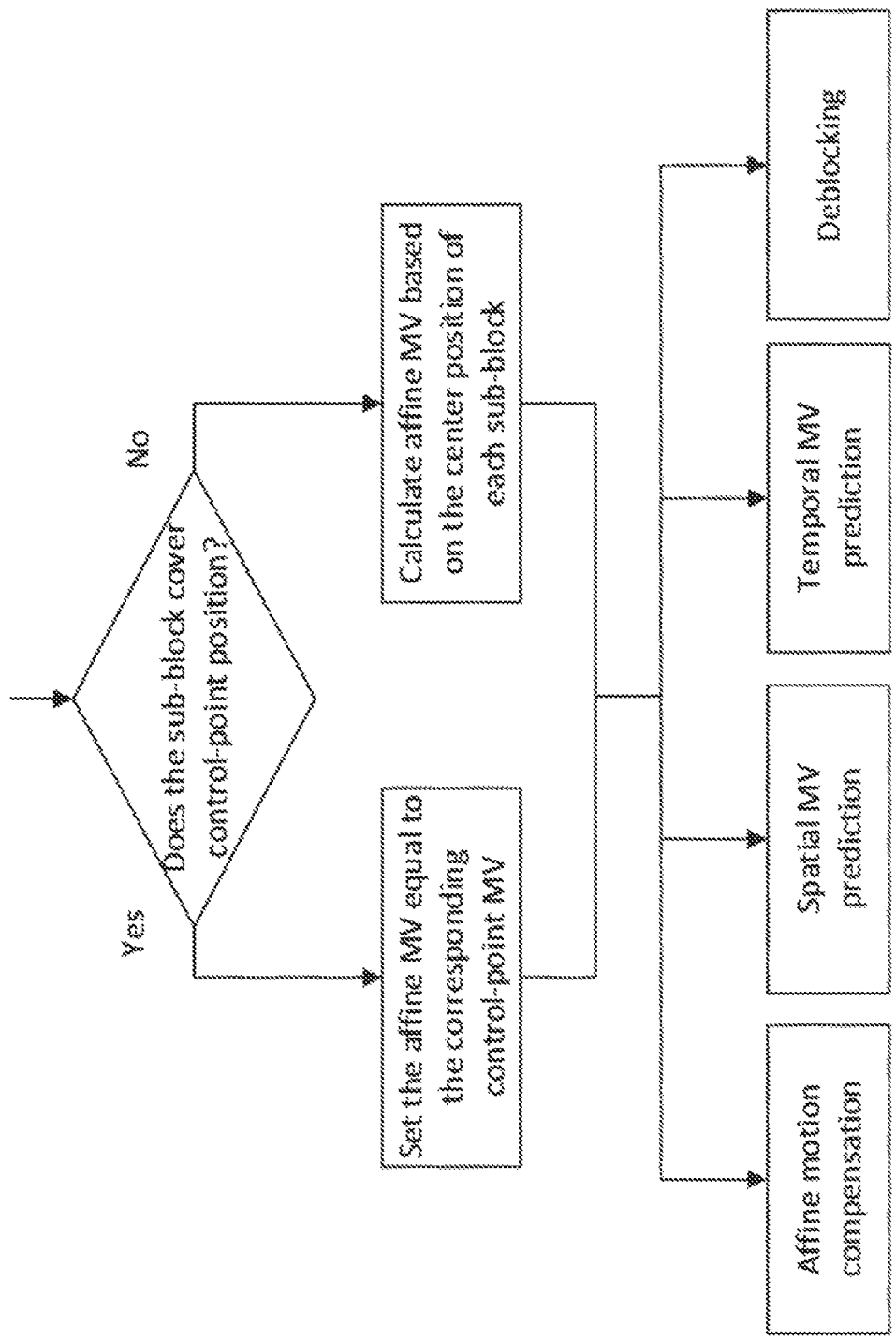
FIG. 13 shows an example workflow of reusing a motion field used for MV prediction and deblocking to generate prediction samples for affine coding units (CUs).
Figure 14:
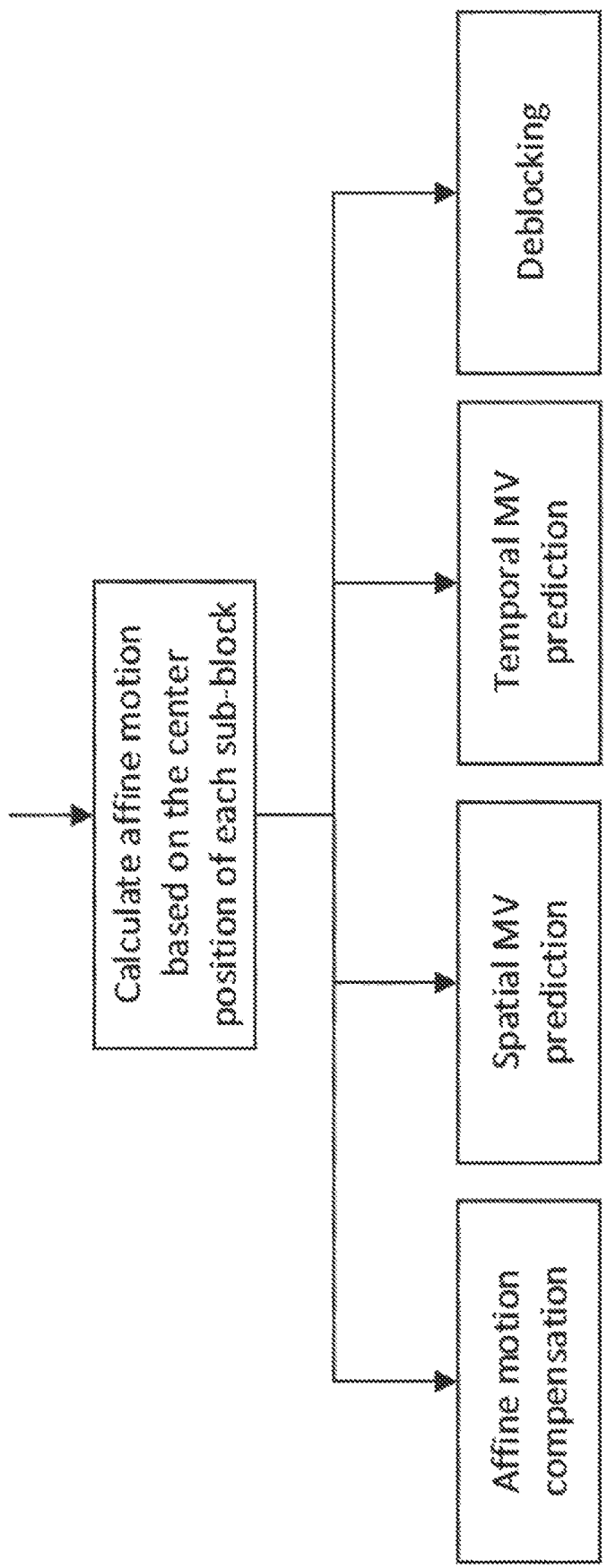
FIG. 14 shows an example workflow of reusing a motion field for generating prediction samples to perform MV prediction and deblocking for affine CUs.

The motion fields that are used at different coding process for CUs that are coded by affine mode may be unified. For example, as illustrated in FIG. 13, the MVs (e.g., as indicated by Equations (24) and (25)) that are used for spatial/temporal MV prediction and deblocking may be reused to generate the prediction samples of the control-point sub-blocks inside affine CUs. For a sub-block located at a control-point position of an affine CU, the MVs that are derived based on the center position of the sub-block (e.g., according to Equation (23)) may be reused at the motion compensation stage. The MVs may be the MV predictors for spatial/temporal MV prediction. The MVs may be used to calculate the boundary strength for the deblocking process. FIG. 14 illustrates the workflow for deriving the motion field of an affine CU.

Motion vector clipping may be used. For example, motion vector clipping may be used when affine mode associated with a video block or a CU is enabled. When affine mode is enabled, the CU may be divided into one or more sub-blocks. The sub-blocks associated with the CU may be equal in size (e.g., 4×4). A sub-block associated with the CU may be assigned an MV. For example, the MV assigned to each of the MVs of a CU may be a unique MV. The assigned MV may be derived by using a 4-parameter affine mode or a 6-parameter affine mode, for example. The type of affine mode (a 4-parameter affine mode or a 6-parameter affine mode) may be signaled at the CU-level. The derived MVs associated with a CU may be stored in a motion field and may be represented using a limited bit depth (e.g., 16-bit in VVC). When deriving a sub-block MV, the value of a calculated MV may be outside a range of values that may be represented based on the motion field bit depth. The calculated MV being outside the range of values may result in arithmetic underflow and/or overflow problems. Such underflow and/or overflow problems may occur even when the control point MVs are in the range specified by the motion field bit depth. The MV may be clipped, for example after derivation of the MV. Clipping the MV may result in similar behavior between various systems that may use varying bit depth values. For example, a video encoding device may use a bit depth value that may be higher than that used by a video decoding device or vice versa.

An MV ($v_x^{i,j}$, $v_y^{i,j}$) of a sub-block (i, j) may be clipped according to Equations 26 as follows:

$$\bar{v}_x^{i,j} = \max(-2^{N-1}, \min(v_x^{i,j}, 2^{N-1}-1))$$

$$\bar{v}_y^{i,j} = \max(-2^{N-1}, \min(v_y^{i,j}, 2^{N-1}-1)) \qquad (26)$$

where N may be a bit depth used for motion field storage (e.g., N=16). As indicated in Equation (26), the MV ($v_x^{i,j}$, $v_y^{i,j}$) of a sub-block (i, j) may be clipped based on motion field range. The motion field range may be the motion field storage bit depth (MFSBD) value. The MFSBD may be represented in number of bits (e.g., 16-bit, 18-bit).

One or more control point MVs may be clipped based on a bit depth value that may be the same as that used for the motion field storage. Control point MVs may be clipped. For example, control point MVs may be clipped after sub-block MV derivation, Control point MVs may be clipped to maintain the precision of the derived MVs. Control point MVs may have higher precision than the motion field storage bit depth. For example, the control point MVs used for sub-block derivation may have higher precision (e.g., may have more bits) than the range of values that may be represented considering the motion field storage bit depth. The control point MVs may be clipped and stored for affine merge derivation of neighboring blocks. For example, the control point MVs may be clipped and stored after derivation.

Various mechanisms may be used to derive sub-block MVs. For example, planar motion vector prediction and/or regression-based motion vector field may be used. MVs associated with each sub-block in a CU may be derived from MVs of the CU's neighboring blocks. For example, the MVs associated with each sub-block may be derived based on the control point MVs of the CU's neighboring blocks. The derived sub-block MVs may be stored in the motion field for future coding. The derived MVs may be clipped based on the value of the motion field storage bit depth to avoid overflow and/or underflow problems.

The control point MVs and/or the sub-block MVs of an affine-coded CU may be used in MV prediction, for example, when predicting a neighboring block. A reference region pointed to by an MV may be outside the picture boundaries and/or may be far away from the picture boundaries, for example, even when the MVs are clipped based on the motion field storage bit depth.

Affine control point MVs and/or the affine sub-block MVs may be clipped within a range value. The range value may be specified by the picture boundaries plus a margin to allow part of the sub-block to be outside of the picture when deriving the MVs of an affine-coded CU. For example, control point MVs may be clipped and/or scaled such that a resulting reference block after affine motion compensation is bounded by the picture boundaries (e.g., considering an additional margin). A sub-block MV may be clipped such that the resulting reference sub-block after motion compensation and the reference picture may overlap by at least one sample.

Figure 15:
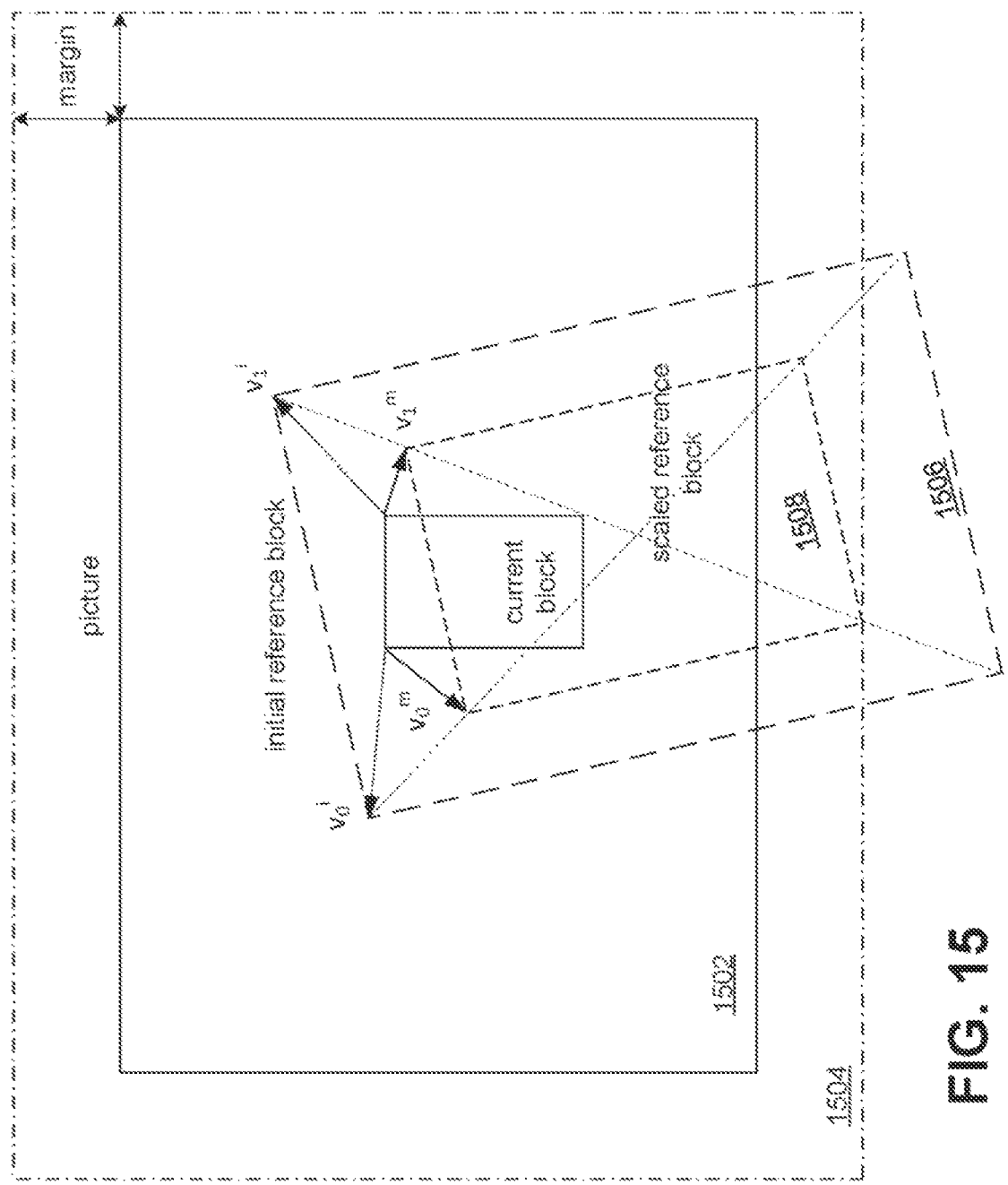
FIG. 15 shows an example of modifying one or more control point MVs to scale a reference block.

FIG. 15 illustrates an example of modifying one or more control point MVs to scale a reference block. As illustrated in FIG. 15, one or more initial control point MVs, $v^i$, associated with an initial reference block 1506 may be modified such that the reference block is scaled as to be fully contained within a desired range. For example, the range may be based on the picture boundaries 1502 plus a margin 1504. As further illustrated in FIG. 15, the modified control point MVs, $v^m$, may be determined based on the coordinates of the scaled reference block 1508. In an example, an initial control point MV may be modified such that the reference block is scaled as to be fully contained within a range value. The range value may be based on the picture boundaries 1502 plus a margin 1504.

Figure 16:
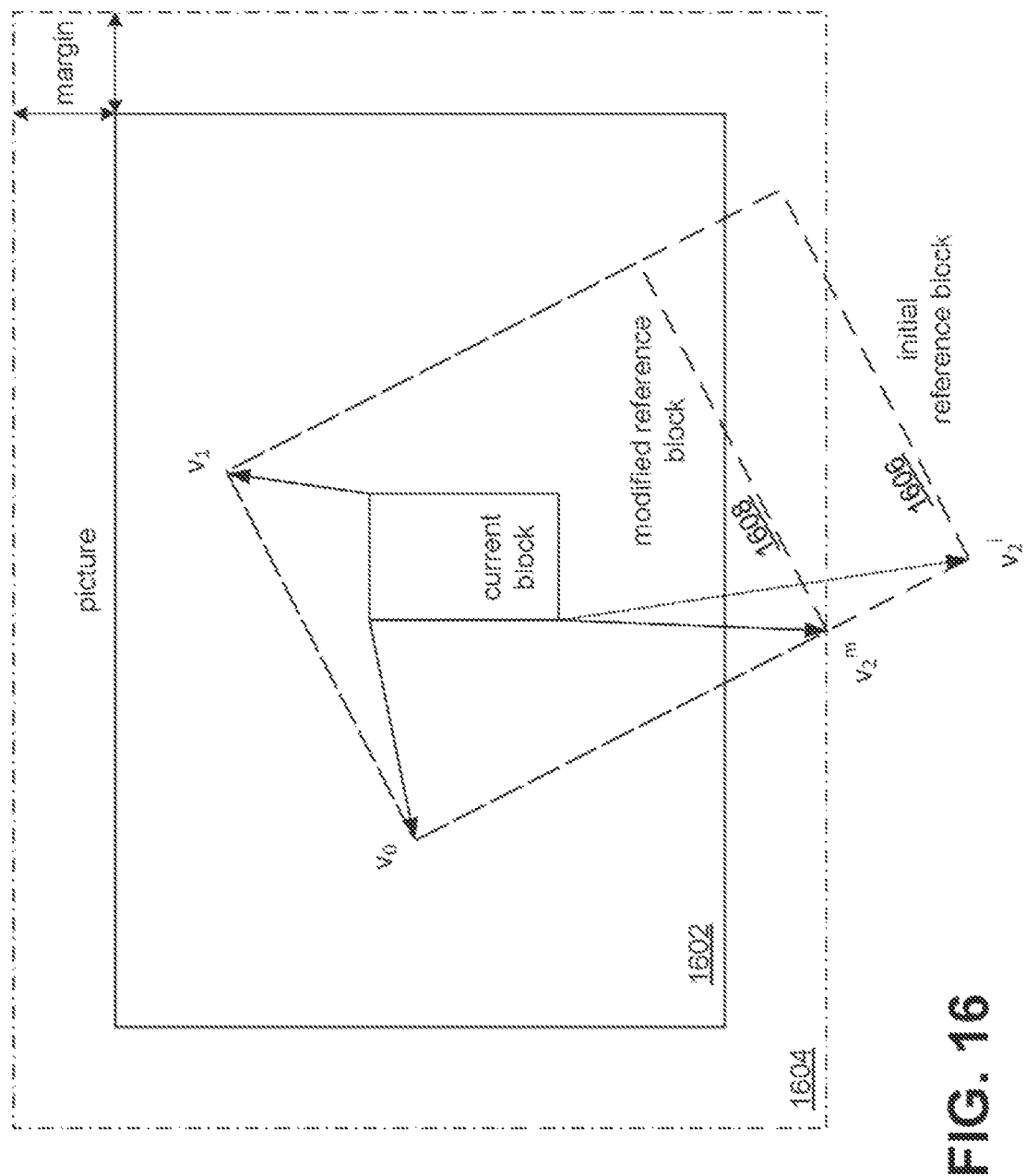
FIG. 16 shows an example of modifying a control point MV to contain a reference block.

FIG. 16 illustrates an example of modifying a control point MV to contain a reference block. As illustrated in FIG. 16, an initial control point MV $v_2^i$ may be modified such that the initial reference block 1606 is beyond a valid region 1604. The valid region 1604 may be based on picture boundaries 1602 plus a margin 1604. The initial control point MV $v_2^i$ may be modified such that the bottom left corner of the modified reference block 1608 is selected as the intersection between the initial reference block 1606 and a valid region 1604. The control point MVs (e.g., all) control point MVs may be modified using various mechanisms. Various techniques may be evaluated, and the technique that may yield the best performance may be selected. For example, a sub-block MV (e.g., each sub-block MV) may be derived from the affine control point MVs. Clipping may be applied to the derived sub-block MV. For example, clipping may be applied based on the location of the sub-block relative to the picture boundaries. In an example, a sub-block MV (e.g., each sub-block MV) may be clipped such that an associated reference sub-block and the reference picture overlap by one or more samples. For example, the horizontal component of a sub-block MV may be clipped between $v_x^{min}$ and $v_x^{max}$ by using Equations (27) and (28):

$$v_x^{max} = W_{pic} - x_{SB} - 1 \qquad (27)$$

$$v_x^{min} = -x_{SB} - W_{SB} + 1 \qquad (28)$$

where $W_{pic}$ and $W_{SB}$ may be the picture width and sub-block width, respectively. $x_{SB}$ may be the horizontal coordinate of the top-left corner of the sub-block within the picture. The vertical component of a sub-block MV may be clipped between $v_y^{min}$ and $v_y^{max}$ by using Equations (29) and (30):

$$v_y^{max} = H_{pic} - y_{SB} - 1 \qquad (29)$$

$$v_y^{min} = -y_{SB} - H_{SB} + 1 \qquad (30)$$

where $H_{pic}$ and $H_{SB}$ may be the picture height and sub-block height, respectively. o may be an offset for filtering operations. $y_{SB}$ may be the vertical coordinate of the top-left corner of the sub-block within the picture. The CU top-left location relative to the picture boundaries may be used (e.g., instead of the sub-block location).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for video decoding, the method comprising:
    determining that affine mode is enabled for a current block that comprises a plurality of sub-blocks;
    obtaining a sub-block motion vector associated with a sub-block of the plurality of sub-blocks;
    clipping the sub-block motion vector based on a bit depth; and
    decoding the sub-block based on the clipped sub-block motion vector.

2. The method of claim 1, wherein the sub-block motion vector is based on a control point motion vector associated with the current block.

3. The method of claim 2, wherein:
the control point motion vector is one of a plurality of control point motion vectors of the current block, and the plurality of control point motion vectors is associated with a plurality of control point positions.

4. The method of claim 3, wherein the plurality of control point positions comprise a top-left control point and a top-right control point based on the width of the current block being greater than the length of the current block.

5. The method of claim 3, wherein the plurality of control point positions comprise a top-left control point and a bottom-left control point based on the width of the current block being less than the length of the current block.

6. The method of claim 3, wherein the plurality of control point positions comprise a bottom-left control point and a top-right control point based on the width of the current block being equal to the length of the current block.

7. The method of claim 1, wherein the clipping of the sub-motion vector is further based on a motion field range.

8. The method of claim 1, wherein the processor is further configured to store the clipped sub-block motion vector for spatial motion vector prediction or temporal motion vector prediction.

9. The method of claim 1, wherein the bit depth is used for motion field storage.

10. A method for video encoding, the method comprising:
determining that affine mode is enabled for a current block that comprises a plurality of sub-blocks;
obtaining a sub-block motion vector associated with a sub-block of the plurality of sub-blocks;
clipping the sub-block motion vector based on a bit depth; and
encoding the sub-block based on the clipped sub-block motion vector.

11. The method of claim 10, wherein the sub-block motion vector is based on a control point motion vector associated with the current block.

12. The method of claim 11, wherein:
the control point motion vector is one of a plurality of control point motion vectors of the current block, and the plurality of control point motion vectors is associated with a plurality of control point positions.

13. The method of claim 12, wherein the plurality of control point positions comprise a top-left control point and a top-right control point based on the width of the current block being greater than the length of the current block.

14. The method of claim 12, wherein the plurality of control point positions comprise a top-left control point and a bottom-left control point based on the width of the current block being less than the length of the current block.

15. The method of claim 12, wherein the plurality of control point positions comprise a bottom-left control point and a top-right control point based on the width of the current block being equal to the length of the current block.

16. (Currently Amended The method of claim 10, wherein the clipping of the sub-motion vector is further based on a motion field range.

17. The method of claim 10, wherein the processor is further configured to store the clipped sub-block motion vector for spatial motion vector prediction or temporal motion vector prediction.

18. A non-transitory computer-readable storage medium including instructions for causing one or more processors to:
determine that affine mode is enabled for a current block that comprises a plurality of sub-blocks;
obtain a sub-block motion vector associated with a sub-block of the plurality of sub-blocks;
clip the sub-block motion vector based on a bit depth; and
decode the sub-block based on the clipped sub-block motion vector.

19. The non-transitory computer-readable storage medium of claim 18, wherein the sub-block motion vector is based on a control point motion vector associated with the current block.

20. The non-transitory computer-readable storage medium of claim 19, wherein:
the control point motion vector is one of a plurality of control point motion vectors of the current block, and the plurality of control point motion vectors is associated with a plurality of control point positions.

* * * * *